United States Patent
Farrelly et al.

(10) Patent No.: US 11,922,340 B2
(45) Date of Patent: Mar. 5, 2024

(54) CONFIGURABLE PUSH NOTIFICATIONS FOR A TRANSPORT SERVICE

(71) Applicant: Uber Technologies, Inc., San Francisco, CA (US)

(72) Inventors: Stacey Farrelly, Oakland, CA (US); Shalin Amin, San Francisco, CA (US); Robert Marshall, San Francisco, CA (US); Kevin Novak, San Francisco, CA (US); Matthew Sweeney, Boston, MA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/835,558

(22) Filed: Jun. 8, 2022

(65) Prior Publication Data

US 2022/0300867 A1  Sep. 22, 2022

Related U.S. Application Data

(63) Continuation of application No. 16/179,608, filed on Nov. 2, 2018, now Pat. No. 11,379,761, which is a
(Continued)

(51) Int. Cl.
*G06Q 10/02* (2012.01)
*G06Q 10/083* (2023.01)
(Continued)

(52) U.S. Cl.
CPC .......... *G06Q 10/02* (2013.01); *G06Q 10/083* (2013.01); *G06Q 30/0284* (2013.01);
(Continued)

(58) Field of Classification Search
CPC ...................................... G06Q 10/02
See application file for complete search history.

(56) References Cited

U.S. PATENT DOCUMENTS

| 4,550,304 A | 10/1985 | Saitta |
| 5,168,451 A | 12/1992 | Bolger |

(Continued)

FOREIGN PATENT DOCUMENTS

| CA | 2889853 | 5/2014 |
| CN | 201918124 | 8/2011 |

(Continued)

OTHER PUBLICATIONS

Horn, Mark ET. "Multi-modal and demand-responsive passenger transport systems: a modelling framework with embedded control systems." Transportation Research Part A: Policy and Practice 36.2 (2002): 167-188. (Year: 2002).*

(Continued)

*Primary Examiner* — Emmett K. Walsh
(74) *Attorney, Agent, or Firm* — Mahamedi IP Law LLP

(57) ABSTRACT

A system and method are provided for generating and transmitting push notifications in connection with a transport service. Push notification triggers can be configured by a user via an application-based user interface corresponding to an application specific to the transport service. A user profile associated with the user can be accessed to detect one or more preconfigured push notification triggers, and thereafter transport service activity can be dynamically monitored for trigger events. Such trigger events can cause the system to generate and transmit push notifications to the user's mobile device.

20 Claims, 9 Drawing Sheets

Related U.S. Application Data continuation of application No. 14/547,289, filed on Nov. 19, 2014, now Pat. No. 10,198,700.

(60) Provisional application No. 61/952,573, filed on Mar. 13, 2014.

(51) Int. Cl.

| | | |
|---|---|---|
| *G06Q 30/0283* | (2023.01) | |
| *G06Q 50/30* | (2012.01) | |
| *G07B 15/00* | (2011.01) | |
| *H04L 67/306* | (2022.01) | |
| *H04L 67/55* | (2022.01) | |
| *H04W 4/029* | (2018.01) | |
| *H04W 4/00* | (2018.01) | |

(52) U.S. Cl.
CPC ............ *G06Q 50/30* (2013.01); *G07B 15/00* (2013.01); *H04L 67/306* (2013.01); *H04L 67/55* (2022.05); *H04W 4/029* (2018.02); *H04W 4/00* (2013.01)

(56) References Cited

U.S. PATENT DOCUMENTS

| | | | |
|---|---|---|---|
| 5,212,645 A | 5/1993 | Wildes et al. | |
| 5,604,676 A | 2/1997 | Penzias | |
| 5,945,919 A | 8/1999 | Trask | |
| 6,028,537 A | 2/2000 | Suman | |
| 6,212,393 B1 | 4/2001 | Suarez | |
| 6,356,838 B1 | 3/2002 | Paul | |
| 6,453,298 B2 | 9/2002 | Murakami | |
| 6,618,593 B1 | 9/2003 | Drutman | |
| 6,756,913 B1 | 6/2004 | Ayed | |
| 6,874,037 B1 | 3/2005 | Abram | |
| 6,925,381 B2 | 8/2005 | Adamczyk | |
| 6,950,745 B2 | 9/2005 | Agnew | |
| 6,989,765 B2 | 1/2006 | Gueziec | |
| 7,080,019 B1 | 7/2006 | Hurzeler | |
| 7,248,184 B2 | 7/2007 | Gelhar | |
| 7,610,145 B2 | 10/2009 | Kantarjiev | |
| 7,657,256 B2 | 2/2010 | Bates | |
| 7,817,990 B2 | 10/2010 | Pamminger | |
| 7,822,426 B1 | 10/2010 | Wuersch | |
| 7,917,153 B2 | 3/2011 | Orwant et al. | |
| 8,065,342 B1 | 11/2011 | Borg | |
| 8,140,256 B1 | 3/2012 | dos-Santos | |
| 8,285,571 B2 | 10/2012 | Demirdjian | |
| 8,339,251 B2 | 12/2012 | Roberts | |
| 8,362,894 B2 | 1/2013 | Shah | |
| 8,489,119 B1 | 7/2013 | Fraccaroli | |
| 8,504,406 B2 | 8/2013 | Miller | |
| 8,538,374 B1 | 9/2013 | Haimo et al. | |
| 8,554,608 B1 | 10/2013 | O'Connor | |
| 8,624,727 B2 | 1/2014 | Saigh et al. | |
| 8,646,194 B2 | 2/2014 | Podd | |
| 8,719,391 B2 | 5/2014 | Hamalainen et al. | |
| 8,768,294 B2 | 7/2014 | Reitnour et al. | |
| 8,799,038 B2 | 8/2014 | Chen et al. | |
| 8,855,916 B2 | 10/2014 | Meredith et al. | |
| 8,909,256 B2 | 12/2014 | Fraccaroli | |
| 9,147,335 B2 | 9/2015 | Rahunathan | |
| 9,299,255 B2 | 3/2016 | Yarnold | |
| 9,372,090 B2 | 6/2016 | Tucker | |
| 9,424,515 B2 | 8/2016 | Atlas | |
| 9,483,744 B2 | 11/2016 | Lord | |
| 9,488,484 B2 | 11/2016 | Lord | |
| 9,552,559 B2 | 1/2017 | Lord | |
| 9,558,469 B2 | 1/2017 | Lord | |
| 9,569,740 B2 | 2/2017 | Lord | |
| 9,599,481 B2 | 3/2017 | Lord | |
| 9,631,933 B1 | 4/2017 | Aula | |
| 9,671,239 B2 | 6/2017 | Lord | |
| 9,689,694 B2 | 6/2017 | Lord | |
| 9,715,667 B2 | 7/2017 | Lord | |
| 9,892,637 B2 | 2/2018 | Demisse | |
| 9,965,960 B1 | 5/2018 | McDavitt-Van Fleet | |
| 9,978,282 B2 | 5/2018 | Lambert | |
| 10,282,684 B2 | 5/2019 | Truong | |
| 11,107,019 B2 | 8/2021 | Hayama | |
| 11,151,489 B2 | 10/2021 | Truong | |
| 2001/0037174 A1 | 11/2001 | Dickerson | |
| 2001/0056363 A1 | 12/2001 | Gantz | |
| 2002/0125839 A1 | 9/2002 | Yen | |
| 2002/0143587 A1 | 10/2002 | Champernown | |
| 2003/0030666 A1 | 2/2003 | Najmi | |
| 2004/0024789 A1 | 2/2004 | Ditcharo et al. | |
| 2004/0049424 A1 | 3/2004 | Murray | |
| 2004/0107110 A1 | 6/2004 | Gottlieb et al. | |
| 2004/0249818 A1 | 12/2004 | Isaac | |
| 2005/0153707 A1 | 7/2005 | Ledyard | |
| 2005/0227704 A1 | 10/2005 | Ferra | |
| 2006/0004590 A1 | 1/2006 | Khoo | |
| 2006/0034201 A1 | 2/2006 | Umeda et al. | |
| 2006/0059023 A1* | 3/2006 | Mashinsky | ............ G06Q 10/02 705/5 |
| 2006/0200306 A1 | 9/2006 | Adamcyzk | |
| 2006/0224437 A1 | 10/2006 | Gupta | |
| 2006/0235739 A1 | 10/2006 | Levis et al. | |
| 2006/0242154 A1 | 10/2006 | Rawat | |
| 2007/0093247 A1 | 4/2007 | Yaqub | |
| 2007/0150375 A1 | 6/2007 | Yang | |
| 2007/0183156 A1 | 8/2007 | Shan | |
| 2007/0224939 A1 | 9/2007 | Jung | |
| 2007/0255627 A1 | 11/2007 | Hallowell | |
| 2007/0265974 A1 | 11/2007 | Chang | |
| 2007/0276595 A1 | 11/2007 | Lewinson | |
| 2007/0279241 A1 | 12/2007 | Jung | |
| 2008/0055049 A1 | 3/2008 | Weill | |
| 2008/0091342 A1 | 4/2008 | Assael | |
| 2008/0114629 A1* | 5/2008 | Pavlov | .................. G06Q 50/30 705/347 |
| 2008/0122691 A1 | 5/2008 | Carani et al. | |
| 2008/0125964 A1 | 5/2008 | Carani | |
| 2008/0195428 A1 | 8/2008 | O'Sullivan | |
| 2008/0228854 A1 | 9/2008 | Grimault et al. | |
| 2008/0270204 A1 | 10/2008 | Poykko | |
| 2008/0277183 A1 | 11/2008 | Huang | |
| 2008/0298058 A1 | 12/2008 | Kan | |
| 2009/0006182 A1 | 1/2009 | Gammon | |
| 2009/0049119 A1 | 2/2009 | Marcinkiewicz et al. | |
| 2009/0143965 A1 | 6/2009 | Chang et al. | |
| 2009/0176508 A1 | 7/2009 | Lubeck et al. | |
| 2009/0192851 A1 | 7/2009 | Bishop | |
| 2009/0216600 A1 | 8/2009 | Hill | |
| 2009/0281844 A1 | 11/2009 | Probst | |
| 2009/0313077 A1 | 12/2009 | Wheeler, IV | |
| 2009/0326991 A1 | 12/2009 | Wei | |
| 2010/0017126 A1 | 1/2010 | Holcman | |
| 2010/0198428 A1 | 8/2010 | Sultan et al. | |
| 2010/0205017 A1 | 8/2010 | Sichelman et al. | |
| 2010/0260350 A1 | 10/2010 | Chutorash | |
| 2010/0280852 A1* | 11/2010 | Huang | ............... G06Q 30/0283 705/400 |
| 2010/0292914 A1 | 11/2010 | Vepsalainen | |
| 2010/0332133 A1 | 12/2010 | Harris | |
| 2011/0000747 A1 | 1/2011 | Wu | |
| 2011/0009098 A1 | 1/2011 | Kong | |
| 2011/0099040 A1 | 4/2011 | Felt et al. | |
| 2011/0102165 A1 | 5/2011 | Rahamim | |
| 2011/0112768 A1 | 5/2011 | Doyle | |
| 2011/0118981 A1 | 5/2011 | Chamlou | |
| 2011/0153629 A1* | 6/2011 | Lehmann | ............... G06Q 30/06 707/E17.014 |
| 2011/0161227 A1 | 6/2011 | Santo, Jr. | |
| 2011/0225269 A1 | 9/2011 | Yap et al. | |
| 2011/0231493 A1* | 9/2011 | Dyor | .................. H04L 51/222 709/206 |
| 2011/0238300 A1 | 9/2011 | Schenken | |
| 2011/0258623 A1 | 10/2011 | Wagner | |
| 2011/0301985 A1 | 12/2011 | Camp | |
| 2011/0301997 A1 | 12/2011 | Gale et al. | |
| 2011/0307282 A1 | 12/2011 | Camp | |
| 2011/0320230 A1 | 12/2011 | Podgurny | |

(56) References Cited

U.S. PATENT DOCUMENTS

| | | |
|---|---|---|
| 2012/0041675 A1 | 2/2012 | Juliver |
| 2012/0046110 A1 | 2/2012 | Amaitis et al. |
| 2012/0290652 A1 | 2/2012 | Juliver et al. |
| 2012/0059693 A1 | 3/2012 | Colodny et al. |
| 2012/0078672 A1 | 3/2012 | Mohebbi |
| 2012/0089326 A1 | 4/2012 | Bouve |
| 2012/0092194 A1 | 4/2012 | Crucs |
| 2012/0131170 A1 | 5/2012 | Spat |
| 2012/0137256 A1 | 5/2012 | Lalancette |
| 2012/0171963 A1 | 7/2012 | Tsfaty |
| 2012/0200411 A1 | 8/2012 | Best |
| 2012/0203599 A1 | 8/2012 | Choi |
| 2012/0215994 A1 | 8/2012 | Gravelle |
| 2012/0232943 A1 | 9/2012 | Myr |
| 2012/0306659 A1 | 12/2012 | Ben-Dayan |
| 2013/0024308 A1 | 1/2013 | Ramaswamy |
| 2013/0054139 A1 | 2/2013 | Bodin |
| 2013/0073327 A1 | 3/2013 | Edelberg |
| 2013/0074111 A1 | 3/2013 | Hyde et al. |
| 2013/0090963 A1 | 4/2013 | Sharma |
| 2013/0102333 A1 | 4/2013 | Dam |
| 2013/0132140 A1 | 5/2013 | Amin |
| 2013/0144831 A1 | 6/2013 | Atlas |
| 2013/0150004 A1 | 6/2013 | Rosen |
| 2013/0162425 A1 | 6/2013 | Raghunathan |
| 2013/0171930 A1 | 7/2013 | Anand |
| 2013/0179205 A1 | 7/2013 | Slinin |
| 2013/0179215 A1 | 7/2013 | Slinin |
| 2013/0290200 A1 | 10/2013 | Singhal |
| 2013/0295963 A1 | 11/2013 | Sen |
| 2013/0310053 A1 | 11/2013 | Srivastava et al. |
| 2013/0316727 A1 | 11/2013 | Edge |
| 2013/0332527 A1* | 12/2013 | Du .................. G06Q 30/0605 709/204 |
| 2013/0339076 A1 | 12/2013 | Baranda |
| 2014/0011522 A1 | 1/2014 | Lin |
| 2014/0051465 A1 | 2/2014 | Ruys et al. |
| 2014/0066090 A1 | 3/2014 | Henderson |
| 2014/0067488 A1 | 3/2014 | James |
| 2014/0081764 A1 | 3/2014 | James |
| 2014/0082069 A1 | 3/2014 | Varoglu et al. |
| 2014/0087697 A1 | 3/2014 | Johnston |
| 2014/0087711 A1 | 3/2014 | Geyer |
| 2014/0108201 A1 | 4/2014 | Frechett |
| 2014/0129135 A1 | 5/2014 | Holden et al. |
| 2014/0129951 A1 | 5/2014 | Amin |
| 2014/0130387 A1 | 5/2014 | Podd |
| 2014/0149544 A1 | 5/2014 | Le Nerriec |
| 2014/0156410 A1 | 6/2014 | Wuersch |
| 2014/0156556 A1 | 6/2014 | Lavian |
| 2014/0164559 A1 | 6/2014 | Demeniuk |
| 2014/0172727 A1 | 6/2014 | Abhyanker |
| 2014/0223787 A1 | 8/2014 | Richmond |
| 2014/0279707 A1 | 9/2014 | Joshua |
| 2014/0365250 A1 | 12/2014 | Ikeda |
| 2015/0031388 A1 | 1/2015 | Chatterjee et al. |
| 2015/0032484 A1* | 1/2015 | Mermelstein .......... G06Q 10/02 705/5 |
| 2015/0046080 A1 | 2/2015 | Wesselius |
| 2015/0127439 A1 | 5/2015 | Campos De Figueiredo Faceira |
| 2015/0148060 A1 | 5/2015 | Parab et al. |
| 2015/0154810 A1 | 6/2015 | Tew |
| 2015/0161564 A1 | 6/2015 | Sweeney |
| 2015/0195133 A1 | 7/2015 | Sheets |
| 2015/0228000 A1 | 8/2015 | Bijor |
| 2015/0262430 A1 | 9/2015 | Farrelly |
| 2015/0310868 A1 | 10/2015 | Mallik |
| 2015/0317568 A1 | 11/2015 | Grasso |
| 2015/0323327 A1 | 11/2015 | Lord |
| 2015/0323329 A1 | 11/2015 | Lord |
| 2015/0323330 A1 | 11/2015 | Lord |
| 2015/0323331 A1 | 11/2015 | Lord |
| 2015/0324334 A1 | 11/2015 | Lord |
| 2015/0324717 A1 | 11/2015 | Lord |
| 2015/0324734 A1 | 11/2015 | Lord |
| 2015/0324945 A1 | 11/2015 | Lord |
| 2015/0325158 A1 | 11/2015 | Lord |
| 2015/0332425 A1 | 11/2015 | Kalanick |
| 2015/0339923 A1 | 11/2015 | Konig |
| 2015/0345743 A1 | 12/2015 | Trincia |
| 2015/0345951 A1 | 12/2015 | Dutta |
| 2016/0014561 A1 | 1/2016 | Inzer |
| 2016/0019728 A1 | 1/2016 | Petrie |
| 2016/0027306 A1 | 1/2016 | Lambert |
| 2016/0034828 A1 | 2/2016 | Sarawgi |
| 2016/0042303 A1 | 2/2016 | Medina |
| 2016/0117610 A1 | 4/2016 | Ikeda |
| 2016/0138928 A1 | 5/2016 | Guo |
| 2016/0180346 A1 | 6/2016 | Cheng |
| 2016/0191637 A1 | 6/2016 | Memon |
| 2016/0217669 A1 | 7/2016 | Benoit |
| 2016/0253617 A1 | 9/2016 | Truong |
| 2016/0356615 A1 | 12/2016 | Arata |
| 2016/0364678 A1 | 12/2016 | Cao |
| 2016/0377445 A1 | 12/2016 | Rodoni |
| 2016/0378303 A1 | 12/2016 | Crilley |
| 2017/0012920 A1 | 1/2017 | Chheda |
| 2017/0017374 A1 | 1/2017 | Herz |
| 2017/0072844 A1 | 3/2017 | Kalanick |
| 2017/0126810 A1 | 5/2017 | Kentley |
| 2017/0193404 A1 | 7/2017 | Yoo |
| 2017/0213160 A1 | 7/2017 | Yerli |
| 2017/0267166 A1 | 9/2017 | Kalanick |
| 2017/0271290 A1 | 9/2017 | Liao et al. |
| 2017/0300848 A1 | 10/2017 | Shoval |
| 2017/0351977 A1 | 12/2017 | Bijor |
| 2018/0101925 A1 | 4/2018 | Brinig |
| 2018/0102017 A1 | 4/2018 | Brinig |
| 2018/0178717 A1 | 6/2018 | Kalanick |
| 2018/0191595 A1 | 7/2018 | Tao |
| 2018/0198535 A1 | 7/2018 | Cirit |
| 2018/0232789 A1 | 8/2018 | Bijor |
| 2018/0375752 A1 | 12/2018 | Tao |
| 2019/0035202 A1 | 1/2019 | Brinig |
| 2019/0051174 A1 | 2/2019 | Haque |
| 2019/0087754 A1 | 3/2019 | Farrelly |
| 2019/0149945 A1 | 5/2019 | Chheda |
| 2019/0152382 A1 | 5/2019 | Kalanick |
| 2019/0197460 A1 | 6/2019 | Truong |
| 2019/0221069 A1 | 7/2019 | Brinig |
| 2019/0320043 A1 | 10/2019 | Goldstein |
| 2019/0327003 A1 | 10/2019 | Cirit |
| 2020/0128361 A1 | 4/2020 | Chheda |
| 2020/0258344 A1 | 8/2020 | Brinig |
| 2020/0269750 A1 | 8/2020 | Kalanick |
| 2020/0374650 A1 | 11/2020 | Jung |
| 2021/0256794 A1 | 8/2021 | Brinig |
| 2021/0266703 A1 | 8/2021 | Chheda |
| 2022/0004973 A1 | 1/2022 | Truong |
| 2022/0118904 A1 | 4/2022 | Kalanick |

FOREIGN PATENT DOCUMENTS

| | | |
|---|---|---|
| CN | 202213529 | 5/2012 |
| CN | 102934393 | 2/2013 |
| CN | 104885386 | 9/2015 |
| CN | 105871903 | 8/2016 |
| CN | 109120497 | 1/2019 |
| GB | 2473831 | 3/2011 |
| JP | 1992027220 | 5/1990 |
| JP | 2000082199 | 3/2000 |
| JP | 2004-302941 | 10/2004 |
| JP | 2004-362271 | 12/2004 |
| JP | 3934985 | 6/2007 |
| JP | 2012088925 | 5/2012 |
| JP | 2014-130552 | 6/2014 |
| JP | 2004-073639 | 5/2015 |
| JP | 2016-157395 | 9/2016 |
| JP | 6218057 | 10/2017 |
| KR | 10-2010-0053717 | 5/2010 |
| KR | 10-2011-0061568 | 6/2011 |
| KR | 10-2012-0090480 | 8/2012 |
| KR | 10-1013-08531 | 9/2013 |
| KR | 10-2014-0124137 | 10/2014 |

(56) References Cited

FOREIGN PATENT DOCUMENTS

| KR | 10-2015-0045962 | 4/2015 |
|---|---|---|
| WO | WO 1999/044186 | 2/1999 |
| WO | WO 1999044186 | 9/1999 |
| WO | WO 2005/013588 | 2/2005 |
| WO | WO 2003/040972 | 5/2005 |
| WO | WO-2009023295 | 2/2009 |
| WO | WO 2011067741 | 6/2011 |
| WO | WO-20110069170 | 6/2011 |
| WO | WO 2013-166216 | 11/2013 |
| WO | WO 2014106617 | 7/2014 |
| WO | WO-2018128781 | 7/2018 |

OTHER PUBLICATIONS

International Search Report in PCT/US2015/021227 dated Jun. 18, 2015.
International Search Report and Written Opinion in PCT/US2016/019895 dated Jun. 29, 2016.
IPRP in PCT/US2016/019895 dated Sep. 8, 2017.
EESR in EP 15765578 dated Oct. 25, 2017.
M.E.T. Horn, "Multimodal and demand-responsive passenger transport systems: a modeling framework with embedded control systems", Transportation Research Part A 36, 167-188 (2002) Year: 2000.
EESR in EP 16824968.8 dated Jan. 30, 2019.
Exam Report No. 1 in AU 2016293831 dated Aug. 28, 2019.
Exam Report in IN 201647031195 dated Oct. 30, 2019.
Exam Report No. 1 in AU 2015231331 dated Nov. 13, 2019.
Exam Report No. 1 in AU 2014386266 dated Feb. 14, 2020.
Office Action in CA 2,942,918 dated Jun. 2, 2020.
Office Action in CA 2,942,339 dated Jan. 20, 2021.
Branscombe, M.; Use your phone to control your car using MirrorLink (Aug. 1, 2012; Tech Radar, pp. 1-2, http://www.techradar.Com/news/car-tech/use-your-phone-to-control-your-car-sing-mirrorlink-1090628 (Year: 2012).
Dillow, C.: "Without Smarts, New York's 'Taxi of Tomorrow' is Really the Taxi of Yesterday" (Apr. 10, 2012); Popular Science, https://www.popsci.Com/cars/article/2012-04/without-connectivity-new-yorks-new-taxi-tomorrow-really-taxi-yesterday (Year: 2012).
Hai Yang et al. "Equilibria of bilateral taxi-customer searching and meeting on networks", Transportation Research Part B., 2010, vol. 44, pp. 1067-1083.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
Aloizio P. Silva, A Mobile Location-Based Vehicle Fleet Management Service Application, 0-7803-78482/03 2003, IEEE.
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).
Grimm, Nicholas "A low-cost contactless micro-payment framework", University of Johannesburg (South Africa), pp. 1-234, 2014.

* cited by examiner

CONFIGURABLE PUSH NOTIFICATIONS FOR A TRANSPORT SERVICE

RELATED APPLICATION

This application is a continuation of U.S. patent application Ser. No. 16/179,608 filed Nov. 2, 2018, which is a continuation of U.S. patent application Ser. No. 14/547,289 filed Nov. 19, 2014 (now U.S. Pat. No. 10,198,700), which claims benefit of priority to U.S. Provisional Patent Application No. 61/952,573, filed Mar. 13, 2014; the aforementioned applications being hereby fully incorporated by reference in their entireties.

BACKGROUND

On-demand services can be requested and arranged through the use of mobile computing devices. For example, a user can operate a computing device to make a request for a transport service to a transport service system, which can then arrange the transport service on behalf of the user. A service provider, such as a driver, can be selected for the user to perform the transport service and be notified by the transport service system.

DETAILED DESCRIPTION

Figure 1:
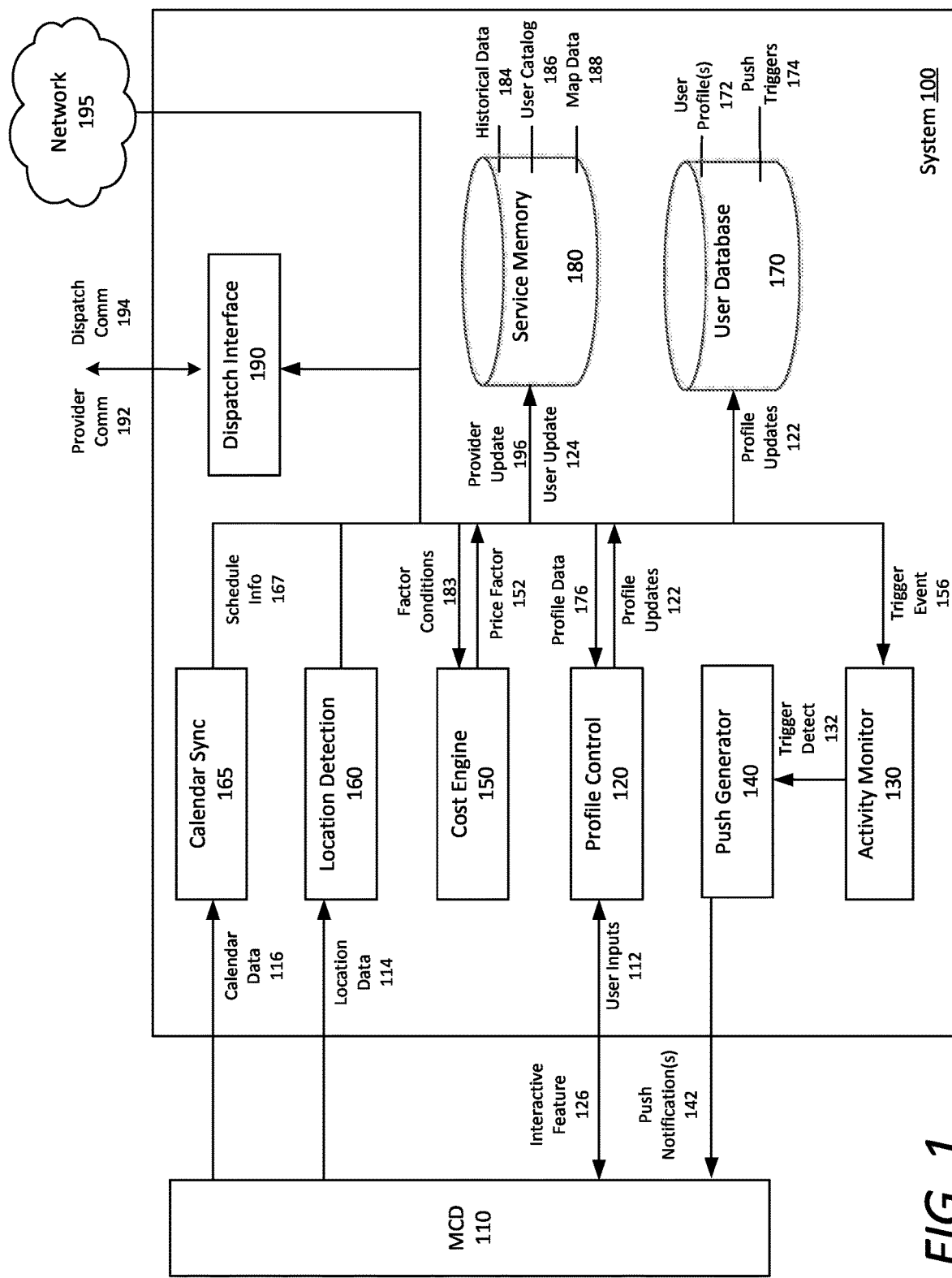
FIG. 1 illustrates an example system for generating and providing push notifications to a mobile device.

Examples described herein provide for systems and methods for generating and providing notifications in connection with an on-demand service to computing devices. Users can operate a plurality of computing devices that are capable of communicating with a system, such as a transport service system, for purposes of requesting transport services. The transport service system can include, or be in communication with, a notification system that provides various notifications to the computing devices in order to inform users of those computing devices of current conditions pertaining to the transport service system.

In some examples, the transport service system can determine a current location of a user's mobile computing device when the user operates the device to request a transport service. The system performs a service area lookup corresponding to the current location of the user to determine whether the user is within a specified service area associated with the transport service. In response to determining that the current location of the user is within the specified service area, the system can generate and transmit an availability push notification informing the user of the mobile computing device that the transport service is available in the specified service area, and that the user can request transport service using the transport service system.

According to some examples, the system can also access a user profile associated with a user of a mobile computing device in order to determine when and what notifications or types of notifications are to be transmitted to the mobile computing device. The user profile can include a set of user-configured preferences specifying one or more push notification triggers. A push notification trigger can be selected, configured, and/or activated to cause the system to transmit a notification to an appropriate device when a corresponding event (e.g., a trigger event) occurs. The system can detect notification triggers in the user profile and monitor transport service activity for trigger events corresponding to the one or more configured notification triggers. For each detected trigger event, the system can generate and transmit one or more push notifications to the mobile computing device according to each push notification trigger.

Still further, in one example, the system can dynamically determine and/or adjust a price for the transport service for individual geographic regions or service areas (e.g., adjust a price factor or multiplier). The price can be determined based on one or more conditions of a specified service area. In some cases, a user may not want to request a transport service when the price factor is high in a given region (e.g., 2.5X of the default price). The user can configure a push notification trigger in the user's profile by setting a price or price factor threshold (e.g., 1.75X) for that push notification trigger, thereby requesting the transport service system to notify the user when the price decreases below a specified price factor threshold (e.g., notify when the price factor is under 1.75× in the user's given service area). As used herein, such a push notification trigger can be referred to as a price notification trigger. In response to determining that the user profile includes a price notification trigger, the system can monitor transport service activity and automatically generate and transmit a price push notification to the mobile computing device when the price factor drops to or below the specified price factor threshold.

Depending on implementation, one or more conditions that can affect the price factor can include current conditions relating to supply and demand of the transport service (e.g., economic conditions). As described herein, a price for the transport service can be a value that can be changed using a price factor or multiplier (e.g., 1.25×, 2×, 3×). For example, a default or a base price factor (e.g., 1×) may be initially set for the transport service according to normal or default operation conditions. Thereafter, a fluctuating number of transport service requests as compared to a fluctuating number of available transportation providers can affect the price factor accordingly. Furthermore, many other factors can play into affecting the price factor, such as a service area being parsed into individual regions and sub-regions, fuel costs, traffic, weather, and the like.

According to another example, the transport service system can also use the price factor thresholds provided by users to determine and/or adjust a price for the transport service in a given area. For a given region, the transport service system can determine a plurality of price factor thresholds for a plurality of users from those users' price notification triggers. Each price factor threshold can be stored in a database or data store associated with or available to the transport service system (e.g., with the individual user's profile), can be specified by a respective user, and can cause the transport service system to transmit a notification to a device of the respective user when the price factor for the transport service decreases to a threshold price factor specified by the respective user. The transport service system can determine the current price or price factor for the transport service based, at least in part, on the plurality of price factor thresholds.

Further still, various other use case scenarios may be configured by the user to trigger a push notification. For example, push notifications can be triggered by rideshare and/or fare-share opportunities, ride acceptance by a transportation provider, driver arrival, ride cancellation, promotional offers and alerts, received credits, incident alerts, time-related or calendar-based events, a favorite driver being proximate to the user's location, driver alerts or other communications, reminders, etc. Additionally, push notifications can be customized via audio and/or visual features for differing trigger events.

In one example, push notifications can also be interactive, in which user selection of a push notification can cause the user's device to generate and provide an interactive feature that can include a map. For transport sharing uses, for example, the map can indicate current locations corresponding to other users associated with additional user profiles. The interactive feature can further include other features to enable the user to communicate with other users and/or transport service providers within a specified service area.

The described processes, operations, and methods may be initiated autonomously or in response to a user interaction. For example, an initial step of determining the current location of the mobile computing device can be performed in response to a launch of an application that is specific to the transport service and that can communicate with the transport service system (e.g., a designated service application). Furthermore, the step of performing the service area lookup corresponding to the current location of the user can be performed in response to detecting the user's location being within a predetermined distance from a point of interest, such as an airport or a rideshare center. Further still, the application can be launched automatically when the user's mobile computing device is activated, such that any of the disclosed steps can be performed in response to any number of location-based or situational triggers.

As used herein, a client device, a driver device, and/or a computing device refer to devices corresponding to cellular devices or smartphones, personal digital assistants (PDAs), laptop computers, tablet devices, etc., that can provide network connectivity and processing resources for communicating with the system over a network. A driver device can also correspond to on-board vehicle computers or custom hardware, etc. The client device and/or the driver device can also individually operate a designated service application configured to communicate with the transport service system.

Still further, while some examples described herein relate to transport services, the system can enable other on-demand location-based services (for example, a food truck service, a delivery service, an entertainment service) to be arranged between individuals and service providers.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium non-transitory in nature. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system 100 for generating and providing push notifications 142 to a mobile computing device 110. As discussed, a mobile computing device 110 can be a device that is operated by a user requesting transport services and/or a driver that provide the services. According to an example, the system 100 includes a profile control module 120, a service activity monitor 130, a push generator 140, a cost engine 150, a location detection 160, a calendar sync 165, a user database 170, a service memory 180, and a dispatch interface 190. The system 100 can also include one or more device interfaces (not shown in FIG. 1) to enable the system 100 to exchange information with a plurality of mobile computing devices 110. Various elements of the system 100 may be combined as a single or multiple components performing various steps of the disclosed processes. For example, modules or components of the system 100 (e.g., profile control 120, service activity monitor 130, etc.) can be implemented by one or more processors of a computing device(s) through execution of instructions stored in a memory resource. Furthermore, elements such as the user database 170 and the service memory 180 may be implemented as random access memory (RAM), read-only memory (ROM), or any other form of volatile or non-volatile memory.

Referring to FIG. 1, a user of the mobile computing device 110 can launch an application specific to a transport service (e.g., referred to herein as a designated service application or service application). The service application can enable various user interface(s) to be displayed by the mobile computing device 110 for purposes of enabling a user to request a transport service. In one example, the service application can communicate with the system 100 to display interactive features 126 as part of a user interface, so that inputs received via the interactive features 126 can be provided to the system 100. While a single mobile computing device 110 is illustrated in FIG. 1 for purposes of simplicity, the system 100 can communicate with a plurality of mobile computing devices 110 that are each operated by a user.

For example, on a respective mobile computing device 110, a user can interact with the interactive features 126 to create and/or manage a user profile 172, via user inputs 112, to specify the user's preferences with his or her account. The profile control module 120 can process the user inputs 112 in order to modify the user's profile 172. According to examples, the user of the mobile computing device 110 can configure push notification triggers 174 in the user's profile 172 to receive push notifications 142 when specific trigger events 156 occur. Such trigger events 156 can be related to a transport service, and can include events such as, the availability of the transport service itself. Trigger events 156 can also include any type of scenario associated with the transport service, including, for example, the arrival of a service vehicle, or the cancellation of a provider.

The mobile computing device 110 can be any device capable of running applications or programs. As discussed, the mobile computing device 110 may be a device such as a smart phone, tablet computer, a wristwatch computing device or other wearable computer, a person digital computer (PDA), a laptop computer, or any other type of personal computer. Furthermore, the mobile computing device 110 can include a display, such as a touch-sensitive display, with which the user may interact. Accordingly, the user may provide various user inputs 112 in order to interact with the interactive features 126. The interactive features 126 can also include the transmitted push notification 142, which can also be interactive. As such, the service application can be fully interactive and dynamic to allow for continuous and constant user interaction to, for example, communicate with the system 100, other users and/or transportation providers, view and interact with a provided interactive map, and/or provide profile updates 122 to add, modify, delete, activate, and/or deactivate various push notification triggers and to provide general updates to the user profile 172.

In some variations, the mobile computing devices 110 that individually operate the service application can communicate with the system 100 via the dispatch interface 190 to transmit requests for transport service with pick-up and/or destination locations, to cancel requests, to modify requests, etc. Additionally, transportation providers can operate their own mobile computing devices 110 to send communications 192 to provide their own updates 196 to the system 100, such as the providers' current location, the state of the providers, etc., by using their own service applications. The dispatch interface 190 can enable the mobile computing devices 110 to communicate with the system 100 for purposes of providing information about users and transport providers, and can also enable the system 100 to interface with the dispatch system (not shown in FIG. 1), which is responsible for receiving transport requests and selecting drivers to arrange transport services. For example, the dispatch system can send dispatch communications 194 to the transport service providers (e.g., drivers) to invite selected providers to accept a transport service, or to update service activity.

The mobile computing device 110 can also include a global navigation satellite system (GNSS) antenna and module for receiving location signals from orbiting location-based satellites (e.g., global position system (GPS) satellites). As such, the mobile computing device 110 can transmit location data 114 to the location detection 160 of the system 100, which can be utilized to provide transport services and push notifications 142 according to the user's location. The location detection 160 can communicate the location data 114 of the mobile computing device 110 to the service activity monitor 130 for trigger event processing, or can transmit the location data 114 to the service memory 180 for storage. Temporary storage of the location data 114 in the service memory 180 can allow the system 100 to reference map data 188 and correlate the user's position in relation to available transport service providers.

The system 100 further includes a profile control module 120 which receives selections or inputs 112 of interactive features 126 from the mobile computing device 110 to allow the user to modify the user profile 172. In particular, profile data 176, which can be shown in the interactive feature 126 when the user accesses his or her profile from the mobile computing device 100, can be configured, modified, and/or updated according to the user's preferences. Such profile updates 122 may be sent to the user database 170 in order to update the user profile 172. The profile updates 122 can include various user configured push notification triggers 174, discussed in detail with respect to FIG. 2.

Furthermore, the profile control module 120 can provide user updates 124, which can include information such as when a particular user is active or has launched the application. In variations, the user updates 124 can be transmitted to the service memory 180, which can actively store data corresponding to a dynamic and interactive map 188, user activity and location, an active user catalog 186, and other historical data 184 corresponding to the transport service. The data stored on the service memory 180 can ultimately be used by the service activity monitor 130 to detect trigger events 156 which cause the push generator 140 to generate and transmit a push notification 142 to the mobile computing device 110. In some examples, the push generator 140 can access a content store (not shown in FIG. 1) to generate a push notification 142 to include particular content (e.g., text, graphics, notification alert type, etc.) based on the trigger event 156.

The user updates 124 can be any information pulled from the mobile computing device 110, inputted by the user, or received over the network 195. Such user updates 124 can include schedule information 167 pulled from a user's calendar or the user's calendar account over the network 195. In variations, the calendar sync 165 can synchronize with the user's calendar on the mobile computing device 110 and pull calendar data 116, which can be used to ultimately provide the user with push notifications 142 corresponding to the user's schedule. Accordingly, the user can configure the user profile 172 to include one or more push notification triggers 174 relating to the user's schedule, whereby a push notification 142 can be transmitted to the user in correlation with the user's schedule.

As an example, the user may have a flight scheduled from a particular airport. The system 100 can access the user's schedule via the calendar sync 165, pull calendar data 116, and recognize that the flight is, for example, a domestic flight, and that the airport is known for having delays relating to security, check-in, etc. Accordingly, the service activity monitor 130 can automatically send a trigger detection signal 132 to the push generator 140 to generate a push notification 142 at a predetermined time (e.g., three hours) prior to the scheduled flight. In such variations, the push notification 142 can provide information to the user, for example, information relating to the user's schedule and/or asking the user whether or not she wishes to request a ride.

The user updates 124 can also include information regarding the user's location. For example, changes in the user's position can be communicated to a driver so that the pick-up location itself can be dynamically updated. Accordingly, a user may request a pick-up and thereafter, the system can track the user's location and provide updates to the requested driver. In another example, the system 100 can recognize that the driver is within a proximity to the user based on the user's location, and can provide a push notification 142 indicating the arrival of the driver, and a location for pick-up.

The service activity monitor 130 can receive various inputs in order to determine whether a trigger event 156 has occurred. Some of these inputs may be trigger events 156 themselves, such as the availability of vehicle for pick-up. Other trigger events 156 may be determined by the service activity monitor 130 based on any number of factors. For example, the service activity monitor 130 can communicate with the user database 170 in order to process the user-configured push notification triggers 174 from a given user profile 172. As an example, the push notification triggers 174 can be included in a lookup table or list featured in the user profile 172, such as the list(s) shown in FIG. 2. The service activity monitor 130 can individually process each item in the list and continuously monitor transport service activity for corresponding trigger events 156.

The service activity monitor 130 can receive an input from the profile control module 120, which can include dynamic updates to the user profile 172, such as updated push notification triggers 174. As such, the service activity monitor 130 can be configured to dynamically and continuously monitor the transport service system for not only trigger events 156, but also profile updates 122 such as a user activation of a particular push notification trigger 174.

Furthermore, the service activity monitor 130 can receive inputs from the service memory 180, which can provide the service activity monitor 130 with user and provider activity information, location data 114 of both users and transportation providers, map data 188 corresponding to location and direction information, and service conditions providing information relating to the management of the transport service. Other information, such as weather, traffic information, road conditions, etc., may also be provided to the service activity monitor 130 to aid in determining whether a trigger event 156 has occurred.

The service activity monitor 130 can also receive an input from the cost engine 150 corresponding to a price or price factor 152 for the transport service. The cost engine 150 can itself receive inputs (collectively referred to as factor conditions 183) dynamically or periodically from the dispatch interface 190 and/or the service memory 180 to ultimately determine a price factor 152 for the transport service in different geographic regions or sub-regions. As described herein, a region or sub-region can be defined by three or more location data points that make up a perimeter of the region or sub-region. The system 100 can have access to a database or data store that stores the location information about the regions and/or sub-regions for purposes of assigning drivers to users and for purposes of determining prices for the transport service.

For example, the transport service can have a continuously fluctuating number of service requests as compared to transportation providers for each of one or more service areas or regions. Each region may have its own set default rate which can itself fluctuate according to supply and demand conditions. Furthermore, each region may be further subdivided into sub-regions, each having its own base or default rate. Accordingly, conditions such as the number of available transportation providers versus a number of requests in a given service may act to increase or decrease the price factor 152 in that service area.

In some variations, the cost engine 150 can observe or use factor conditions 183, such as a change or spike in the number of requests during particular time periods, e.g., during rush hour or following a sporting event. As such, a dynamic calculation may be made and the price factor 152 would increase according to the increase in demand for a given region. Additionally or alternatively, off-peak hours may result in a surge of available transportation providers due to the lack of requests. With the lack of demand, the price factor 152 may be dynamically decreased according to the decreased demand. The same is true for the supply-side of the calculation. For example, an increase in available transportation providers given a constant number of requests would cause a decrease in the price factor. Also, a decrease in the number of transportation providers given a constant number of requests would cause the price factor to increase accordingly.

The calculation or determination of a price factor (e.g., 1.5× or 2.75× of a default price) may not be limited to the number of requests versus the number of available transportation providers. The cost engine 150 may also base its price factor calculations on numerous other factor conditions 183. These factor conditions 183 can include current weather and/or road conditions. For example, storm conditions can cause road hazards and either encourage or discourage people from using the transport service. The price factor 152 may fluctuate accordingly. Furthermore, factors 183 such as traffic conditions, road closures, urban and rural environments, mountainous terrain, tolls, and any combination of the foregoing, can also be used to adjust the price factor 152.

One of the user-configured push notification triggers 174 can be a price notification trigger that specifies a price factor threshold setting (or "surge threshold" setting). The service activity monitor 130 can issue a trigger detection signal 132 to the push generator 140 (to cause the push generator 140 to generate and transmit a push notification 142 to a user device 110 in a specified region) when the price factor 152 drops below the user-specified price factor threshold for the specified region. Accordingly, the user can be notified of the price factor 152 via the push notification 142 (e.g., "The price is now below 1.5×."), which can further be interactive so that the user can send an acknowledgment to request a transportation provider.

For example, a user may be attending an event or engaged in an activity during a duration of time (e.g., "prime" hours) in which the price factor 152 may be unusually high (e.g., 3×). If the user knows that she will want a transport service at some point thereafter, she can open or launch the service application and configure the user profile 172 to set a push notification trigger 174 accordingly to a price factor threshold. For example, the user can set the threshold at 1.25×, such that once the service activity monitor 130 determines that the price factor 152 has dropped to or below 1.25×, a push notification 142 can be sent to the user's mobile computing device 110. In another example, the user may configure multiple thresholds so that the user can be notified once when the price factor drops below a first threshold (1.5×), and then be notified again when the price factor drops below a second threshold (1.25×).

In some examples, the system 100 can also use the price factor thresholds in price notification triggers 174 specified by users to determine and/or adjust a price for the transport service in a given area. For example, the factor conditions 183 can also include the price factor thresholds specified by users, which can be used, along with other factor conditions 183, by the cost engine 150 to determine and/or adjust a price. For a given region, such as an area covering a county, a city, or a portion or a neighborhood of a city, etc., the cost engine 150 can programmatically determine the price factor for the transport service based on real-time conditions, as discussed above. The price factor can be adjusted dynamically for individual regions, including being increased from 1× (e.g., a default price factor) to 1.75× or 2.5×, etc. or being decreased from 2.25× to 1.5×, etc. In one example, the cost engine 150 can determine the different price factor thresholds specified by active users in a specific region (e.g., those users who have the service application running on their devices 110 in an active and/or a suspended mode), determine the number of users at each of those price factor thresholds, and use the determined information to adjust the price factor in the specific region.

For illustration, a first user in Region A can set her price factor threshold setting to be 1.5×, a second user in Region A can set her price factor threshold setting to be 1.75×, and a third user in Region A can set her price factor threshold setting to be 2.5×. Other users in Region A can also set similar price factor threshold settings at any of those values or at other values (e.g., 1.25×, 2.25×, etc.). Because there are a multitude of users in a given region (e.g., dozens, hundreds, thousands, etc.), such as in Region A, the system 100 can view, as a whole, in general, the various price factor thresholds set by users and how many users have selected such thresholds by accessing the profiles 172.

In this example, Region A can have 100 active users who have not yet requested transport services but have their service applications open, have their service applications in a suspended state, and/or have launched the service applications within a last predetermined duration of time (e.g., the last hour). They may be waiting for the price factor in the region to decrease because they think it is too high. Of the 100 active users, 20 users may have set no price factor thresholds, and the remaining 80 users may have set different price factor thresholds. There may be 20 users who specified a 1.5× threshold, 25 users who specified a 1.75× threshold, 15 users who specified a 2× threshold, 12 users who specified a 2.25× threshold, 6 users who specified a 2.5× threshold, and 2 users who specified a 2.75×. In this example, based on the real-time information about users and transport providers in Region A, the cost engine 150 can determine that the price factor for the transport service should be dropped from 3× to 1.5×. This can be a result of a large number of transport providers being on-duty from being previously off-duty, for example.

However, reducing the price factor to 1.5× may result in 60 users receiving push notifications 142 from system 100 as a result of the push notification triggers 174 corresponding to price factor thresholds set by those users. Many of these users (e.g., 35 users out of 60) may then determine that the price is low enough such that they would like to request transport services. If many users request transport services around a similar time, e.g., within 10-30 seconds of receiving the notification, the dispatch system would be flooded with requests (e.g., causing a delay as a result of high network bandwidth and/or causing prices to be dynamically adjusted very high yet again). In some examples, the cost engine 150 can determine that the number of users that would receive the push notifications 142 is higher than a threshold number (e.g., a predetermined number). By using the price factor thresholds provided by users, instead of reducing the price factor to 1.5× (as initially determined using real-time conditions), the cost engine 150 can programmatically reduce the price factor in Region A to a different price factor, such as 2.2× or 2.1×. In this manner, the system 100 and dispatch system would transmit push notifications 142 to 20 users (as opposed to 60), and consequently, would not be flooded with transport requests from 35 users at substantially the same time, for example. The system 100 can then gradually adjust the prices in a region.

Depending on variations, the cost engine 150 can be configured (e.g., via parameters or settings provided by an administrator/user of the system 100) to use the price factor thresholds to determine the price factor for a given region so as to allow only a threshold number of users (or threshold percentage of active users) in the region to receive a price-based push notification at once (concurrently). In the example above, the cost engine 150 may have been configured to only allow 20 users to receive a price-based push notification 142 at once.

Still further, in other examples, the price factor thresholds provided by users can be stored as part of historical data 184. For a given region, prior price factor thresholds provided by users at different durations of time (e.g., a particular month, a season, a time of day, a specific day of the week, etc.), can be stored at historical data 184 so that the cost engine 150 can use historical price factor thresholds information to determine and adjust prices. Prior price factor thresholds at different durations can be indicative of what people are typically willing to pay for transport services. This information can also be helpful to determine price schemes for different hours of a day or for different days of the week, etc.

Depending on implementation, push notifications 142 may be a passive notification which simply sends respective information, or alternatively, the push notifications 142 can be interactive and include features for automatically requesting a transportation provider, dismissing the notification, setting a reminder, delaying a request, cancelling the push notification trigger 174, communicating with the requested driver, etc.

Furthermore, the service activity monitor 130 may monitor for any combination of trigger events 156 before sending the trigger detection signal 132. For example, the user can modify the user profile 172 to combine one or more push notification triggers 174 such that combination of trigger events 156 must occur before a push notification 142 is sent to the user's device 110. In such variations, the user can configure push notifications 142 to only be sent under extremely narrow conditions.

The user profile 172 may also include one or more trigger profiles for special cases or scenarios in which the user wishes to be notified. Such trigger profiles may be selectable to automatically configure the push notification triggers 174 in a preconfigured manner. For example, the user may have a trigger profile for workday evenings, and preconfigure push notification triggers relating to price factor 152, traffic conditions, and the like. The user may select this workday evening trigger profile such that a push notification 142 is delivered only when all conditions are met. Once the push notification 142 is received, the satisfied user can request a transportation provider for a ride home. Along these lines, any number of use case scenarios involving any combination of push notification triggers 174 are contemplated. Furthermore, it is envisioned that a user can configure any number of trigger profiles for any number of scenarios in which conditions must be met before a push notification 142 is generated and delivered.

The system 100 may further be connected to the one or more networks 195 to pull various data and information from any number of predetermined websites or applications. As an example, the service activity monitor 130 can receive data relating to traffic updates, or link to a map service (e.g., GOOGLE MAPS), in order to dynamically monitor for trigger events 156.

As discussed, in some examples, the push generator 140 can generate and transmit a push notification 142 to the user's mobile computing device 110. Such push notifications 142 can be triggered by way of any user-configurable scenarios or conditions. Furthermore, the push generator 140 can be activated or otherwise triggered to generate a push notification 142 upon receiving a trigger detection signal 132 from the service activity monitor 130. The trigger detection signal 132 can simply be a signal to generate a default push notification 142. Alternatively, the service activity monitor 130 can configure the trigger detection signal 132 to communicate to the push generator 140 to generate any number of preconfigured push notifications 142.

In variations, the push generator 140 can generate customized or various preconfigured push notifications 142 according to a particular trigger event 156 or push notification trigger 174. Such customizations and pre-configurations can include any number of visual designs or cues. For example, a push notification 142 can be a simple number indicating a trigger event 156 has occurred. Alternatively, the push notification 142 can include text regarding a particular trigger event 156 or push notification trigger 174, and can further include certain indicators, designs, or graphic representations relating to the particular trigger event 156 or push notification trigger 174. Additionally or alternatively, the push notification 142 can include one or more audio features that can be triggered when the push notification 142 is delivered. Such audio features can also be customized or preconfigured according to a particular trigger event 156 or push notification trigger 174.

As discussed herein, a trigger event 156 may be any scenario, condition, or combination of scenario(s) and/or condition(s) giving rise to a push notification 142. In some examples, the trigger events 156 may be inexorably connected to push notification triggers configured or customized by the user via the user profile 172. As discussed above, the user profile can provide for a list of push notification triggers 174 discussed in further detail with respect to FIG. 2 below.

As an addition or an alternative, the service memory 180 can store one or more rules or parameters that instruct the service activity monitor 130 to provide a trigger detection signal 132 when a combination of conditions occur (e.g., in response to detecting a trigger event 156 based on two or more conditions). For example, notification information (e.g., configured by users) in users' profiles 172 can be used by the system 100 to trigger or cause other push notifications to be generated and provided to one or more user devices.

The service activity monitor 130 can use push notification triggers identified in users' profiles 172 and other detected/determined information, such as real-time conditions information (e.g., time of day, location information from the location detection 160) and/or other system information to determine a trigger event 156.

As an example, the service activity monitor 130 can determine that a particular user has configured, in her profile 172, a push notification trigger 174 based on a price for the transport service at a first time, $t=t1$. The user's push notification trigger 174 can request the system 100 to provide a notification 142 to the user's device 110 when the price for the transport service is at or below a 1.75× price factor. The service activity monitor 130 can detect that the user's location at time $t=t1$, was at a specific location, L1. While monitoring the system conditions for trigger events 156 (such as the price factors 152 provided by the cost engine 150), the service activity monitor 130 can determine that the price factor 152 has not dropped to or below the user's specified threshold (e.g., the factor is still at 2.5×). When a predefined amount of time passes (e.g., one hour) in which the user's specified threshold for the push notification trigger 174 has not been reached (e.g., at time, $t=t2$), when the user's current location has not changed by more than a threshold distance at this time (e.g., the user is substantially in or close to the same location, L1), and/or when the activity monitor 130 determines that no notification has been sent to the user's device 110 as a result of the threshold not being met, the activity monitor 130 can determine that a specified trigger event 156 has occurred.

The rule(s) can inform the service activity monitor 130 that when such a trigger event 156 is detected, the activity monitor 130 should cause the push generator 140 to provide, to the user's device 110, a push notification 142 notifying the user that the current conditions are rare and unexpected. For example, the push notification 142 can inform the user that this is not typical, provide a text to apologize to the user for the wait, and even inform that the user has received a promotion or a small credit that has been deposited to the user's account with the system 100 (e.g., an extra ten dollar credit). In such an example, the service activity monitor 130 can also be in communication with a transaction or account manage component of the system 100 (not shown in FIG. 1), so that the service activity monitor 130 can instruct the account manage component to credit the user's account with a specified monetary amount.

User Profile

Figure 2:
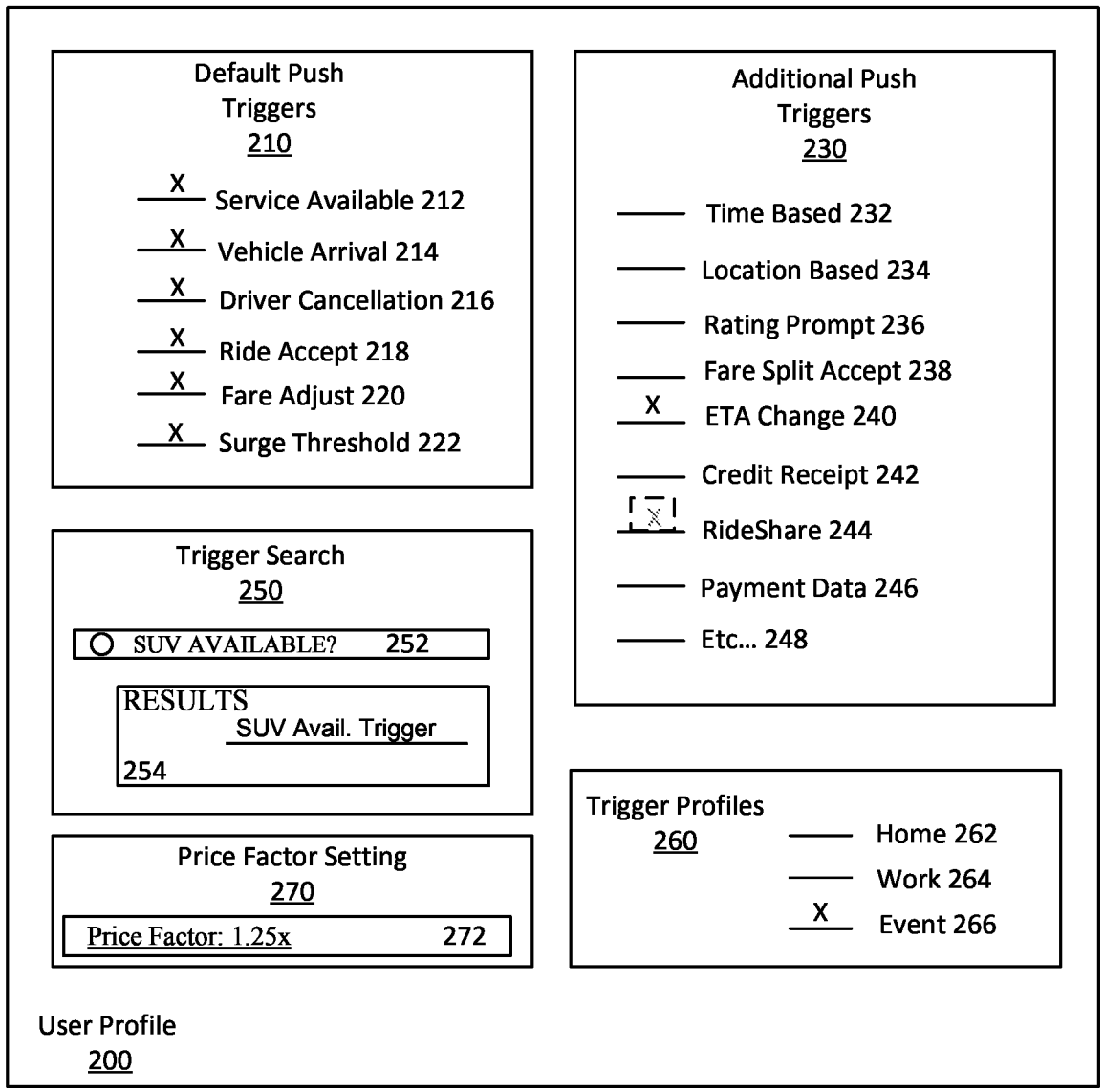
FIG. 2 is an example user profile showing a set of user configurable push notification triggers.

FIG. 2 shows an example user profile showing a set of user configurable push notification triggers. In discussing various examples and implementations of FIG. 2, reference may be made to various components and reference characters of FIG. 1. Referring to FIG. 2, a user profile 200 is provided that includes a default push notification trigger list 210 and an additional push notification trigger list 230. However, implementations may involve a single trigger list configured by the user to for sending push notifications. Further, activated push notification triggers may be preconfigured by the user according to trigger profiles 260, or can be preset by the application provider as default triggers. For example, any number of the push notification triggers listed in the default list 210 or the additional list 230 can be activated or deactivated automatically upon a user selection of a particular trigger profile in a list of available trigger profiles 260 or upon user selection of individual push notification triggers.

Although not illustrated in FIG. 2, each user profile 200 can be associated with a user identifier (e.g., a user ID, such as an email address, name, phone number, etc.) and/or a device identifier of the mobile computing device 110 that the user operates. In some examples, the user profiles 200 can be stored in the user database 170 of the system 100, such as described with respect to FIG. 1.

As shown in FIG. 2, various active and inactive push notification triggers are listed. Active push notification triggers are shown with an "X," however, design choices and activation of push notification triggers may be performed in a variety of ways. Default triggers are shown as active, such as a "service availability" trigger 212, a "vehicle arrival" trigger 214, a "driver cancellation" trigger 216, etc. As an example, activation of a vehicle arrival trigger 214 will cause the service activity monitor 130 to dynamically observe the location of a particular transportation provider. When the provider arrives at the pick-up location (or a predetermined distance or time away from the pick-up location), the service activity monitor 130 can issue a trigger detection signal 132 causing the push generator 140 to generate the appropriate arrival push notification 142.

Additional push notification triggers can be configured as default triggers by the user, or can be preset by the application provider as default triggers. For example, a "ride-accept" trigger 218 can cause a push notification 142 to be generated when a transportation provider accepts a ride request. A "fare-adjust" trigger 220 can cause a push notification whenever a ride request has been accepted, but the rate for the ride has changed—or if the fare or price factor changes during the ride. Also, as discussed above, a "surge threshold" trigger 222 can cause a push notification when the price factor drops below a user configured price factor. In such variations, a price factor setting feature 270 can be provided to allow a user to set a price factor threshold 272 (e.g., 1.25×, where 1× is a base or default rate). Accordingly, the service activity monitor 130 can receive price factor data from the cost engine 150 and cause a push notification 142 to be generated once the price factor crosses below 1.25×.

Additional push notification triggers 230 can also be activated or deactivated by the user either (i) automatically via selection of a trigger profile, or (ii) manually via user input selecting on or more of the additional triggers. As an example, FIG. 2 illustrates the "Event" trigger profile 266 as selected, which may automatically activate or deactivate one or more of the additional or default push notification triggers. However, other trigger profiles, such as a "Home" trigger profile 262, or a "Work" trigger profile 264, can each involve preconfigured push notification triggers activated or deactivated according to the user's preferences.

For illustrative purposes, the push notification trigger labeled as "ETA Change" 240 has been automatically activated upon selection of the Event trigger profile 266. Such a trigger 240 can cause a push notification if a requested driver runs into delays and cannot make a pick-up at a predetermined time. The user may further wish to explore rideshare opportunities, in which other proximate users may have the same or a similar destination. Such proximate users may have a destination or a pick-up location along a route of the requested ride. Accordingly, the user may activate a "rideshare" trigger 244, that can inform other users in the application network of the user's desire to rideshare. The service activity monitor 130 can then monitor the application network for one or more other users accepting or otherwise indicating a desire to rideshare. The push notification 142 associated with this particular push notification trigger 244 can be generated upon (i) another user accepting the rideshare request, (ii) a determination that the accepting user has a pick-up location or destination within a predetermined distance from a calculated route, pick-up location, or destination of the user, or (iii) the current location of the accepting user is within a predetermined distance from the user.

Further additional push notification triggers 230 can be provided, and can include, for example, a "time-based" trigger 232 or "location-based" trigger 234, which can trigger a push notification when the driver is within a certain time or distance from the pick-up. A "rating-prompt" trigger 236 can be set to remind the user to rate a particular driver. Further, a push notification can be triggered when a rideshare user agrees to split a fare. Such a trigger can be termed a "fare-split accept" trigger 238. Further examples include a "credit receipt" trigger 242 that can trigger a push notification when the user receives credits for future rides, or a "payment data" trigger 246 that can be activated to trigger a push notification when a payment receipt has been processed.

Accordingly, any number of use-case scenarios are envisioned for additional push notification triggers 248 that trigger push notifications. Such push notification triggers 248 can correspond to trigger events that include such situations as a fare-split request, an inability of the system 100 to find a driver, promotions and events, "friend" occurrences, an item being left in a vehicle, a password reset, a "friend" joining the service, a favorite driver being within a certain proximity, a notification relating to misuse or lack of use of the service, voting notifications, reminders relating to news and current events (e.g., public transportation strikes), service reminders (e.g., music requests, radio station requests, etc.), specific driver facts during a ride, confirmations (e.g., pick-up address, destination), notifications relating to proximity of "friends," vehicle images, notification relating to payment (e.g., credit card expiration), service milestones (e.g., 20 rides completed), driver communications, location-based messages from other users, location-based reminders (e.g., arrival at an airport), pick-up locations, new service updates and reminders, a "friend" ETA change, log-in information (e.g., log-in from another device), applied credits or promotions to the user's account, service partnership information (e.g., discount information at certain proximate businesses). Still further, for variations corresponding to shared accounts for two or more shared users, push notification triggers can be configured for scenarios in which a shared user requests a ride or is a certain distance or time away from a destination or pick-up location.

Given that many use-case scenarios are possible pertaining to push notification triggers, the user profile 200 can include a trigger search feature 250, in which the user can enter a query or search term/phrase in a provided text field 252, or in another search feature (e.g., a trigger browser feature), for any number of desired triggers. As an example, FIG. 2 shows that the user queried to be notified when a sport utility vehicle (SUV) type is available, and inputted into the text field 252. A search or lookup process can return results 254, which may or may not indicate that a pertinent trigger has been found. In this case, an "SUV availability" trigger has been found, and consequently, the user can configure the trigger on the user profile to trigger push notifications relating to the availability of an SUV.

Methodology

Figure 3:
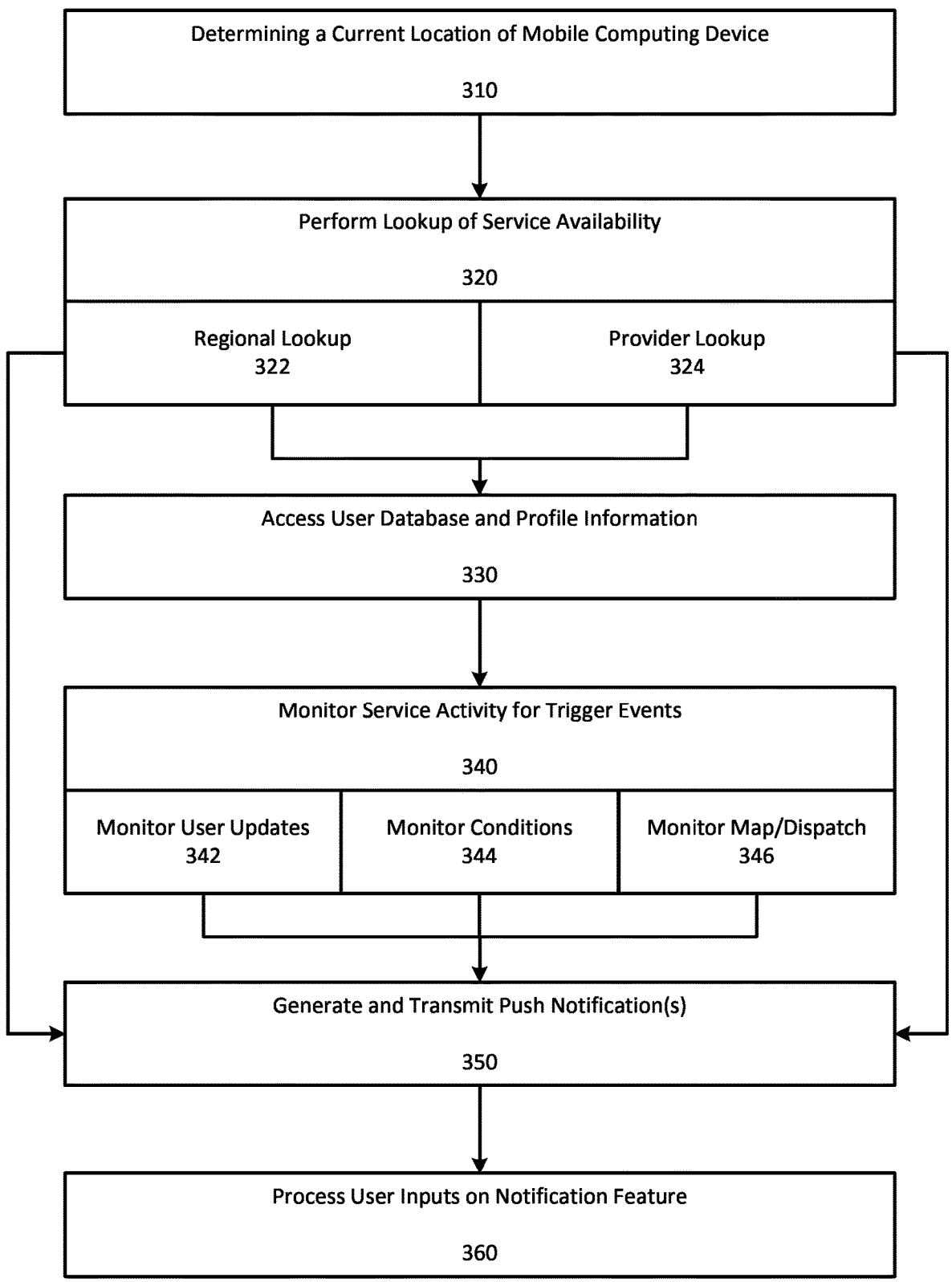
FIG. 3 is an example method of generating and providing push notifications based on user profile information.

FIG. 3 is an example method of generating and providing push notifications based on user profile information. The method as shown in FIG. 3, can be performed by any combination of features of the system 100 as shown in FIG. 1. Referring to FIG. 3, the method includes determining a current location of a user's mobile computing device 110

(310). The location can be determined automatically or in response to the opening or launching of a service application on the mobile computing device 110. The location of the user's mobile computing device 110 can be determined by the location detection 160, which can determine location data 114 (e.g., GPS data) from the mobile computing device 110. This location data 114 can be transmitted directly to the service activity monitor 130 or to the service memory 180 for temporary storage or cataloging.

Upon determining the location of the mobile computing device 110, the method includes performing a lookup of service availability (320). For example, the system 100 can make a determination regarding whether transport service is even available in a region in which the user is located. Accordingly, the system 100 can access the service memory 180 and map data 188 to perform a regional lookup (322) to determine whether the service is available in the particular region. If the transport service is not available in the particular region in which the user is located, a push notification 142 can be generated and transmitted (350) to the user indicating so. However, if the service is available in the particular region, a default push notification 142 can be generated and transmitted (350) indicating that the service is available.

As an addition or an alternative, the system 100 can also perform a provider lookup (324) to determine whether there are any available drivers to provide transport services to the user. Similarly, if a driver is not available, the system 100 can generate and transmit a push notification (350) indicating so. On the other hand, if one or more drivers are available, the system 100 can generate and transmit an availability push notification (350) indicating that one or more drivers are available for pick-up.

Additionally or alternatively, the system 100 can access the user's profile 172 stored in the user database 170 (330). As discussed above, the user profile 172 can include a list of push notification triggers 174 that allow the system 100 to discern the user's preferences in receiving push notifications 142. The system can further process such user configured push notification triggers 174 to configure the service activity monitor 130.

The service activity monitor 130 can thereafter monitor service activity for trigger events 156 corresponding to the user configured push notification triggers 174 (340). Any number of service areas can be monitored, including the user's own mobile device 110 for trigger events. For example, the service activity monitor 130 can receive inputs from the profile control module 120 or the user database 170 to monitor for profile updates 122 (342), in which the user modifies one or more push notification triggers 174. The service activity monitor 130 can further monitor for location changes, or destination changes, of the user. Upon detection of a modified user profile 172 or user updates 124, the system can reconfigure the service activity monitor 130 accordingly.

Additionally or alternatively, the service activity monitor 130 can monitor service conditions (344) for trigger events. Such service conditions can include delays, weather, traffic conditions, and news updates. The service conditions can also include the price factor 152 determined by the cost engine 150, in case a surge trigger has been activated. The service activity monitor 130 can also monitor map data 188 and the dispatch interface 190 (346) for location information and communications from the service providers 192. Accordingly, correlations may be made between the location of the user, the location of the requested driver, and any communications between the system, the user, and the driver. As such, the service activity monitor 130 can monitor such correlations for trigger events 156.

Upon detection of trigger events 156 corresponding to the user configured push notification triggers, the system 100 can generate and transmit push notifications (350) to the user. In response to such a trigger event, 156, the service activity monitor 130 can send a trigger detection signal 132 to the push generator 140, which can generate basic, default, customized, or various preconfigured push notifications 142 according to a particular trigger event 156 or push notification trigger 174. As discussed, such customizations and pre-configurations can include any number of visual designs or cues. For example, a push notification 142 can be a simple number indicating a trigger event 156 has occurred. The push notification 142 can include text regarding a particular trigger event 156 or push notification trigger 174, and can further include certain indicators, designs, or graphic representations relating to the particular trigger event 156 or push notification trigger 174. Additionally or alternatively, the push notification 142 can include one or more audio features that can be triggered when the push notification 142 is delivered. Such audio features can also be customized or preconfigured according to a particular trigger event 156 or push notification trigger 174.

For implementations regarding interactive push notifications 142, the system 100 can then process user inputs upon the interactive feature of the push notification 142. As such, the push notification 142 can be interactive to include features for automatically requesting a transportation provider, dismissing the notification, setting a reminder, delaying a request, cancelling the push notification trigger 174, communicating with the requested driver, etc. Thus, the step of processing user inputs (360) can include any of the aforementioned actions.

Figure 4A:
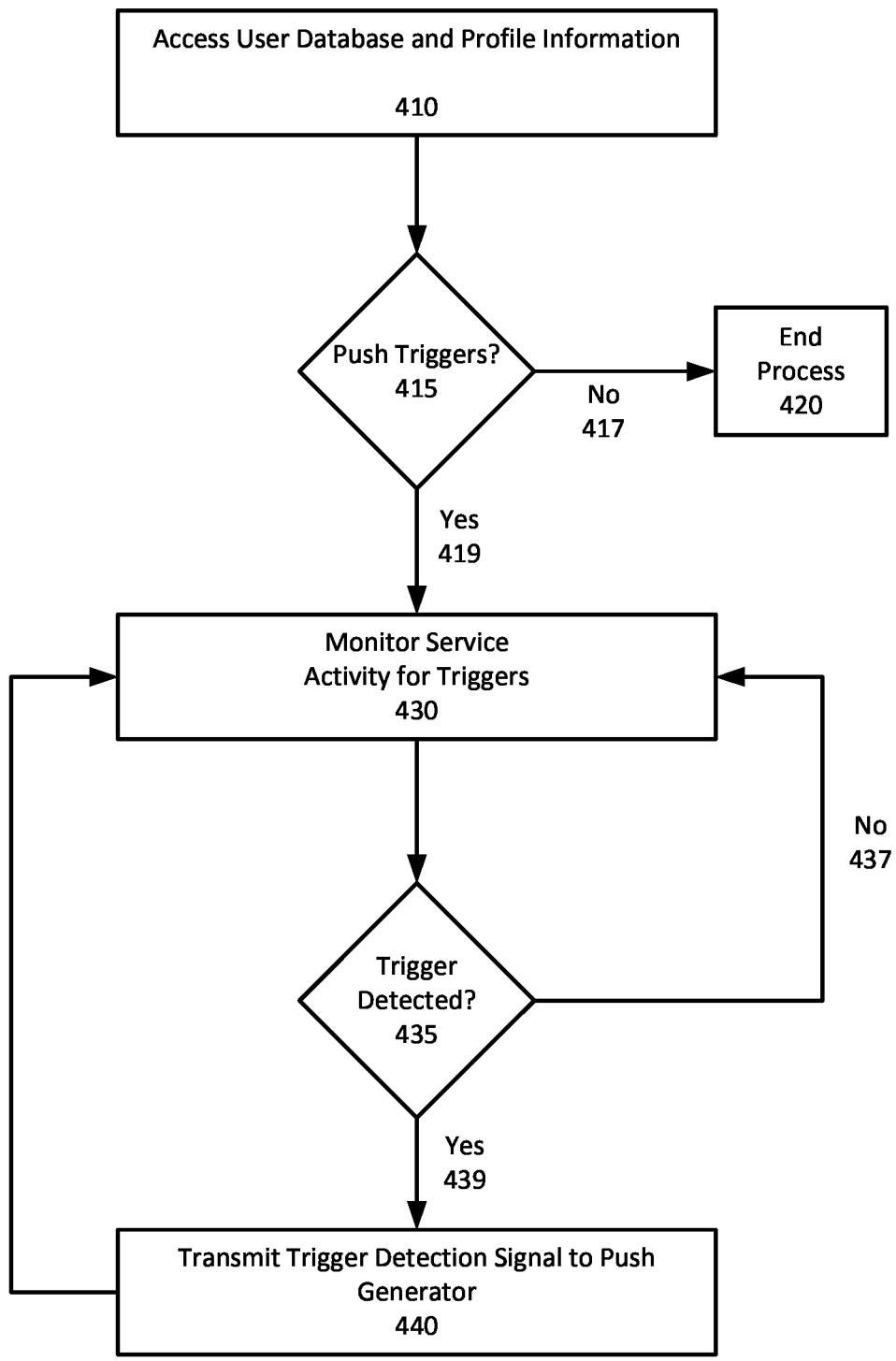
FIGS. 4A and 4B illustrate example dynamic methods of monitoring service activity for push notification triggers.

FIG. 4A illustrates an example dynamic method of monitoring service activity for push notification triggers 174. The method shown in FIG. 4A can be a standalone method, in that it can be performed continuously in response to any number of users being active in the system. For example, the dynamic method of FIG. 4A can automatically and continuously be performed whenever any number of users launch the application specific to the transport service. As an addition or an alternative, the method shown in FIG. 4A can illustrate steps 330, 340 and 350 in FIG. 3, and thus can be performed in response to accessing a particular user profile and/or triggered upon a user request or other mechanism disclosed herein. Furthermore, the method can be performed by, for example, the service activity monitor 130 as shown in FIG. 1.

Referring to FIG. 4A, the service activity monitor 130 accesses the user database 170 to process profile information in the user's profile 172, such as push notification trigger information (410). Step 410 can be performed in response to, for example, (i) a user launching the application specific to the transport service, (ii) a user enabling a trigger detection feature within the application, (iii) a user activating the mobile computing device 110, (iv) a determination that the service is available, or (v) other initiating events, etc. In some examples, step 410 can be performed in response to first detecting a trigger event. The service activity monitor 130 can then determine whether any push notification triggers 174 exist (e.g., have been configured) in the user's profile 172 (415). If not (417), the service activity monitor 130 can end the process (420), which can comprise sitting idle for a predetermined period of time before restarting the process, or simply ending the process for that particular user until a trigger causes the process to restart. However, if the service activity monitor 130 does determine that push notification triggers 174 have been activated in the user's profile 172 (419), the service activity monitor 130 can then monitor service activity for trigger events 156 corresponding to those detected push notification triggers 174 (430).

Any number of events can occur that do not comprise trigger events 156, which themselves are dependent on user configurations. Thus, the service activity monitor 130 can continuously determine whether a trigger event has been detected (435). If an event occurs that is not a trigger event (437), the service activity monitor 130 can continue to monitor service activity for trigger events 156 (430). For example, the user can have the surge trigger deactivated. Accordingly, when the price factor drops below what is normally the user's price factor threshold (e.g., 1.25×), the service activity monitor 130 can determine that a trigger event 156 has not occurred, or simply ignore the event, and continue to monitor service activity for trigger events 156 (430).

When a trigger event 156 is detected (439), the service activity monitor 130 can transmit a trigger detection signal 132 to the push generator 140 (440) so that the push generator 140 can generate and transmit a push notification 142 to the user's mobile computing device 110. The trigger detection signal 132 can be a simple trigger signal informing the push generator 140 to transmit a generic push notification 142 to the mobile computing device 110. Additionally or alternatively, the trigger detection signal 132 can be customized, encoded, or otherwise configured with instructions for the push generator 140 to generate a push notification 142 specific to the detected trigger event 156. As discussed above, such push notifications 142 can be interactive to include customized features according to the trigger event 156. For example, the trigger detection signal 132 can provide the push generator 140 information to generate distinct audio and visual features, including text associated with the trigger event 156, for automatically requesting a transportation provider, dismissing the notification, setting a reminder, delaying a request, cancelling the push notification trigger 174, communicating with the requested driver, etc.

Figure 4B:
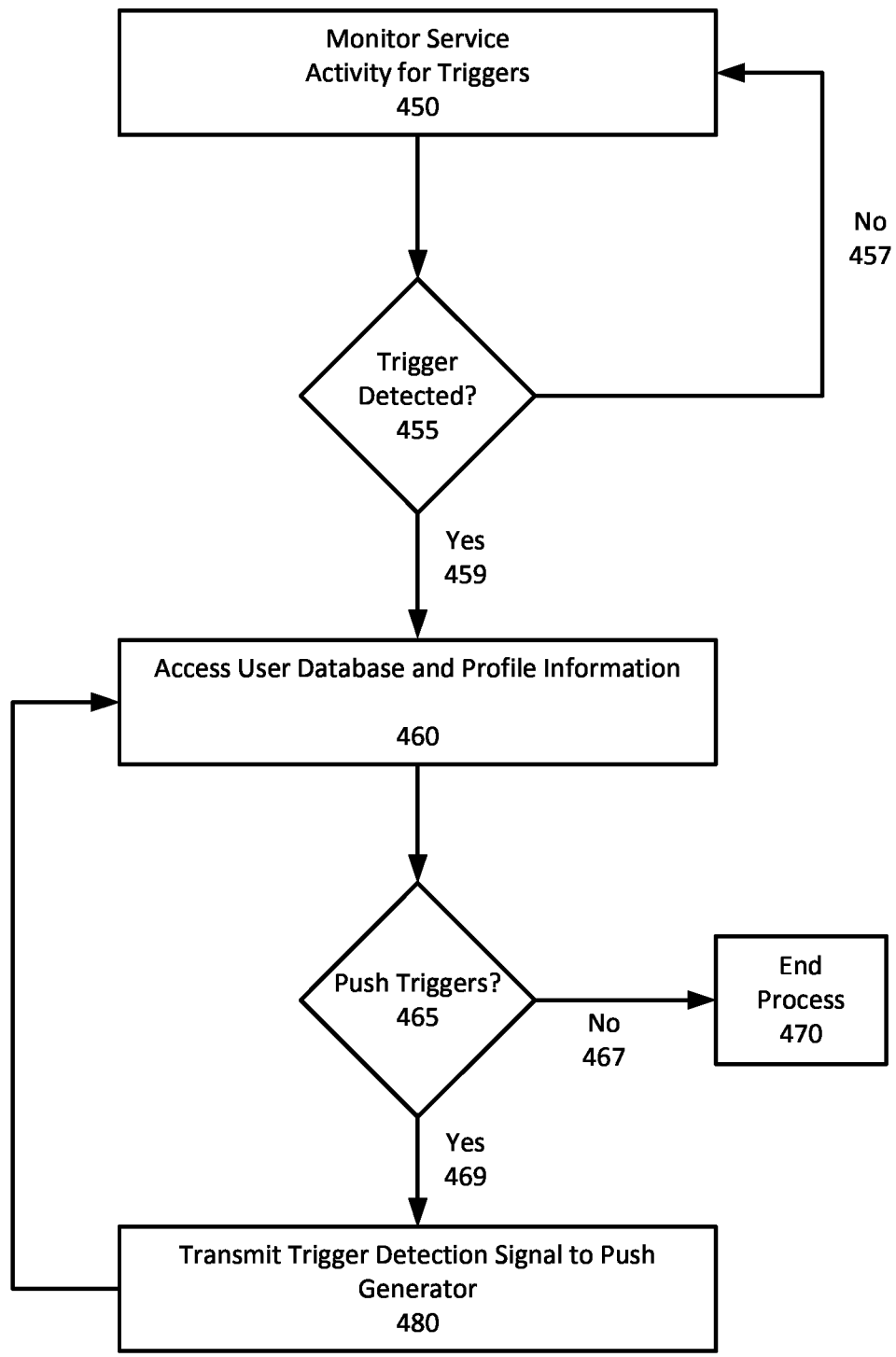

FIG. 4B illustrates another example dynamic method of monitoring service activity for push notification triggers 174. The method shown in FIG. 4B can be a standalone method, in that it can be performed continuously in response to any number of users being active in the system. For example, the dynamic method of FIG. 4B can automatically and continuously be performed whenever any number of users launch the application specific to the transport service. In some examples, FIG. 4B can be performed by the system 100 concurrently with FIG. 4A. As an addition or an alternative, the method shown in FIG. 4B can illustrate steps 330, 340 and 350 in FIG. 3, and thus can be performed in response to accessing a particular user profile and/or triggered upon a user request or other mechanism disclosed herein. Furthermore, the method can be performed by, for example, the service activity monitor 130 as shown in FIG. 1.

In FIG. 4B, the service activity monitor 130 can monitor the service activities for trigger events 156 (e.g., periodically, based on a schedule, in response to certain system events, etc.) (450). For example, depending on implementation, step 450 can be performed (i) periodically (e.g., every three or five seconds to detect whether a change to a service activity has occurred), (ii) in response to a user or service provider launching the service application or performing a function on the service application, and/or (iii) based on a user-specified schedule, etc. The service activity monitor 130 can determine whether a trigger is detected (455). If no trigger is detected (457), then the service activity monitor 130 continues to monitor for trigger events 156 in the system 100. As an example, the detected trigger can correspond to the cost engine 150 reducing a price factor 152 from a first price factor (e.g., 2×) to a lower second price factor (e.g., 1.5×) in a given area or region.

If a trigger is detected (459), the service activity monitor 130 can access the user database 170 to process profile information in the users' profiles 172, such as push notification trigger information that corresponds to or is associated with the detected trigger (460). According to some examples, the service activity monitor 130 can determine whether any push notification triggers 174 exist in one or more users' profiles 172 based on the detected trigger (465). If not (467), the service activity monitor 130 can end the process (470), such as described above with respect to FIG. 4A. However, if the service activity monitor 130 does determine that push notification triggers 174 have been configured in the user's profile 172 (469), the service activity monitor 130 can transmit a trigger detection signal 132 to the push generator 140 to cause the push generator 140 to generate and transmit a push notification 142 to one or more users' mobile computing devices 110 based on the push notification trigger information (480).

For example, referring back to the previous example, the service activity monitor 130 can determine that a plurality of users that are operating service applications in the given area or region have configured push notification trigger information in their profiles 172. Of those plurality of users, the service activity monitor 130 can determine that a set of those users have configured push notification trigger information in which they have requested a push notification when the price factor for the transport service drops to or below 1.5×. In this example, the push generator 140 can receive an indication of the set of users' individual identifiers (e.g., user IDs or mobile device IDs of those set of users) and provide a push notification 142 to each of the set of users that requested the push notification under such specified condition using the identifiers. Only those users that specified such a push notification trigger information can receive the push notification that the price factor has reduced from 2× to 1.5×.

Figure 4C:
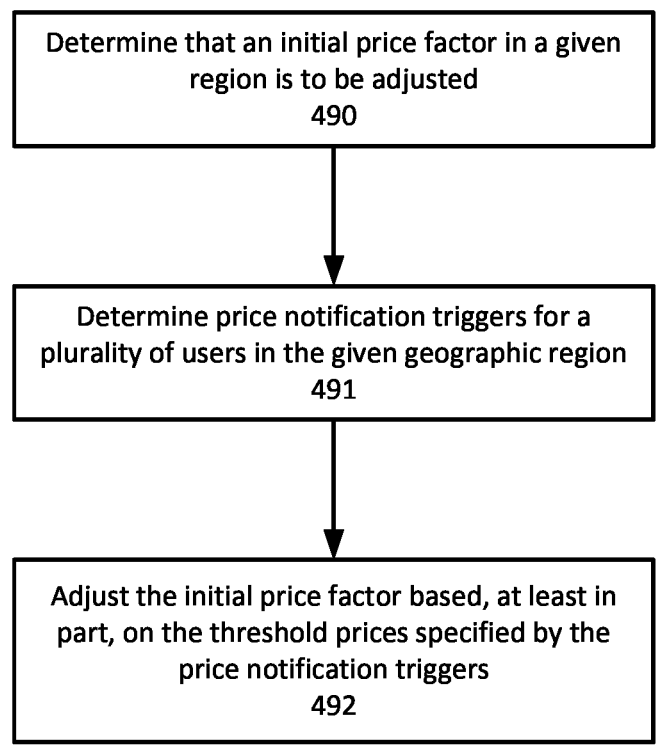
FIGS. 4C and 4D illustrate example methods of adjusting prices based on push notification triggers.

FIG. 4C illustrates an example method of adjusting prices based on information from push notification triggers. The method as shown in FIG. 4C, can be performed by any combination of features of the system 100 as shown in FIG. 1 (e.g., the activity monitor 130 and the cost engine 150). In addition, in some examples, the system 100 can perform the example method of FIG. 4C for individual regions or sub-regions concurrently (and continuously as the prices can dynamically change in individual regions or sub-regions).

According to an example, the system 100 can determine that an initial price factor in a given region is to be adjusted (490). The initial price factor can be a current price factor for the given region. The cost engine 150, for example, can use real-time data about users operating the service application and drivers that are available to provide transport service in the given region, as well as other current conditions. The system 100 can determine that the initial price factor is to be decreased, for example, to a new adjusted price factor.

In one example, however, before the system 100 adjusts the initial price factor, the system 100 can determine price notification triggers for a plurality of users in the given region (491). Each price notification trigger can be stored in a data store accessible by the system 100, such as part of a corresponding user's profile, can be configured by the corresponding user, and can cause the system 100 to transmit a push notification to the corresponding user's device when the price factor for the transport service decreases to the user-specified price factor threshold. The system 100 can adjust the initial price factor based on the price factor thresholds specified in the price notification triggers (492). For example, instead of changing the initial price factor of 3× to 1.5×, based on the price factor thresholds, the system 100 can cause the initial price factor to be adjusted from 3× to 2.5×.

According to some examples, the system 100 can periodically or continuously determine the price notification settings for the plurality of users in the given region by monitoring the profiles of the plurality of users in the given region. As such, in some examples, the system 100 can perform steps 490 and 491 concurrently so that the system 100 determines that the initial price factor is to be adjusted based on price factor thresholds identified from the price notification settings.

Figure 4D:
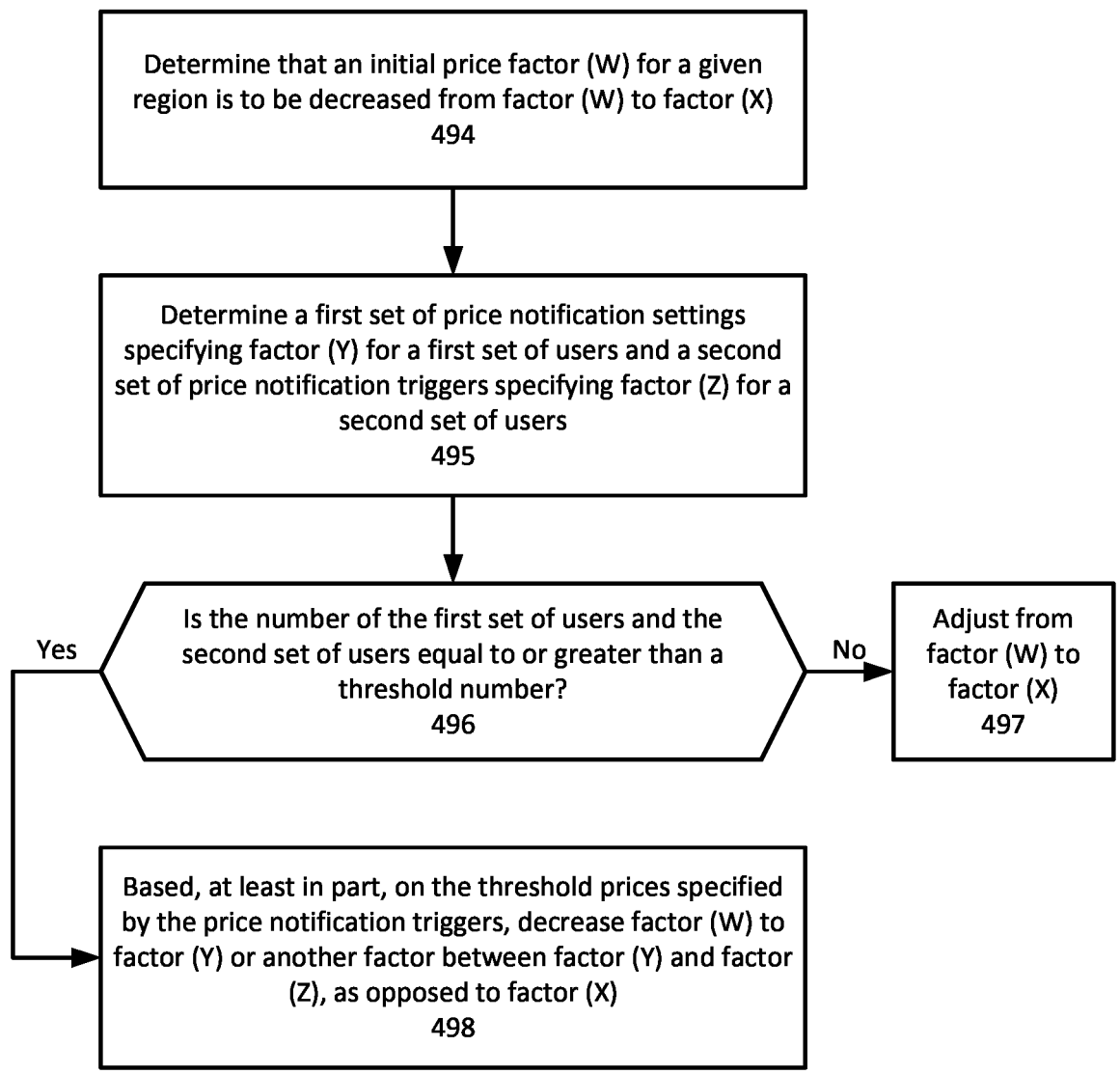

FIG. 4D illustrates another example method of adjusting prices based on information from push notification triggers. The method as shown in FIG. 4D, can be performed by any combination of features of the system 100 as shown in FIG. 1. In one example, FIG. 4D can illustrate a more detailed method as compared to the method of FIG. 4C.

FIG. 4D is described with particular values for purposes of simplicity. The system 100 can determine that an initial price factor (W) (e.g., 3×) for a given region is to be decreased from factor (W) to a new price factor (X) (e.g., 1.5×) (494). The system 100 can determine price notification triggers for a plurality of users in the given region, including, for example, a first set of price notification triggers that specify a first price factor threshold (Y) for a first set of users and a second set of price notification triggers that specify a second price factor threshold (Z) for a second set of users (495). In this example, the first price factor threshold (Y) can correspond to 2.5×, while the second price factor threshold (Z) can correspond to 2×.

The system 100 can determine whether the number of the first set of users and the number of second set of users is equal to or greater than a threshold number (496). For example, for this particular given region, the threshold number of users can be 10. If there are 10 or more users total in the first and second sets of users (e.g., 25 users), the system 100 can determine that the initial price factor (W) should not be dynamically adjusted to the price factor (X) because there may be too many users that attempt to request a transport service at substantially the same time (e.g., within 0-30 seconds of each other). As such, the system 100 can dynamically adjust the initial price factor (W) to a price factor that would prevent a large number of users from being notified to request a transport service.

Referring back to FIG. 4D, if the number of the first set of users and the number of second set of users is less than a threshold number, the system 100 can adjust the initial price factor (W) to the predetermined price factor (X) (497). On the other hand, if the number of the first set of users and the number of second set of users is equal to or greater than a threshold number, the system 100 can adjust the initial price factor (W) to another price factor that is greater than the price factor (Z) (498). For example, the system 100 can adjust the initial price factor (W) to the price factor 2.5× a price factor between 2.5× and 2×, so that only the first set of users who configured price notification triggers at 2.5× receive the push notifications from the system 100. Accordingly, the system 100 can adjust prices for the transport service based, at least in part, on price factor thresholds specified in notification triggers.

As an addition or an alternative, although only two sets of users are described in FIG. 4D, in other examples, more than two sets of users can specify more than two price factor thresholds (e.g., a first set of users can specify a first factor threshold at 0.75×, a second set of users can specify a second factor threshold at 1×, a third set of users can specify a third factor threshold at 1.25×, and so forth). Similarly, multiple threshold numbers of users can be used by the system 100 to determine the price factor for a given region.

Hardware Diagram

Figure 5:
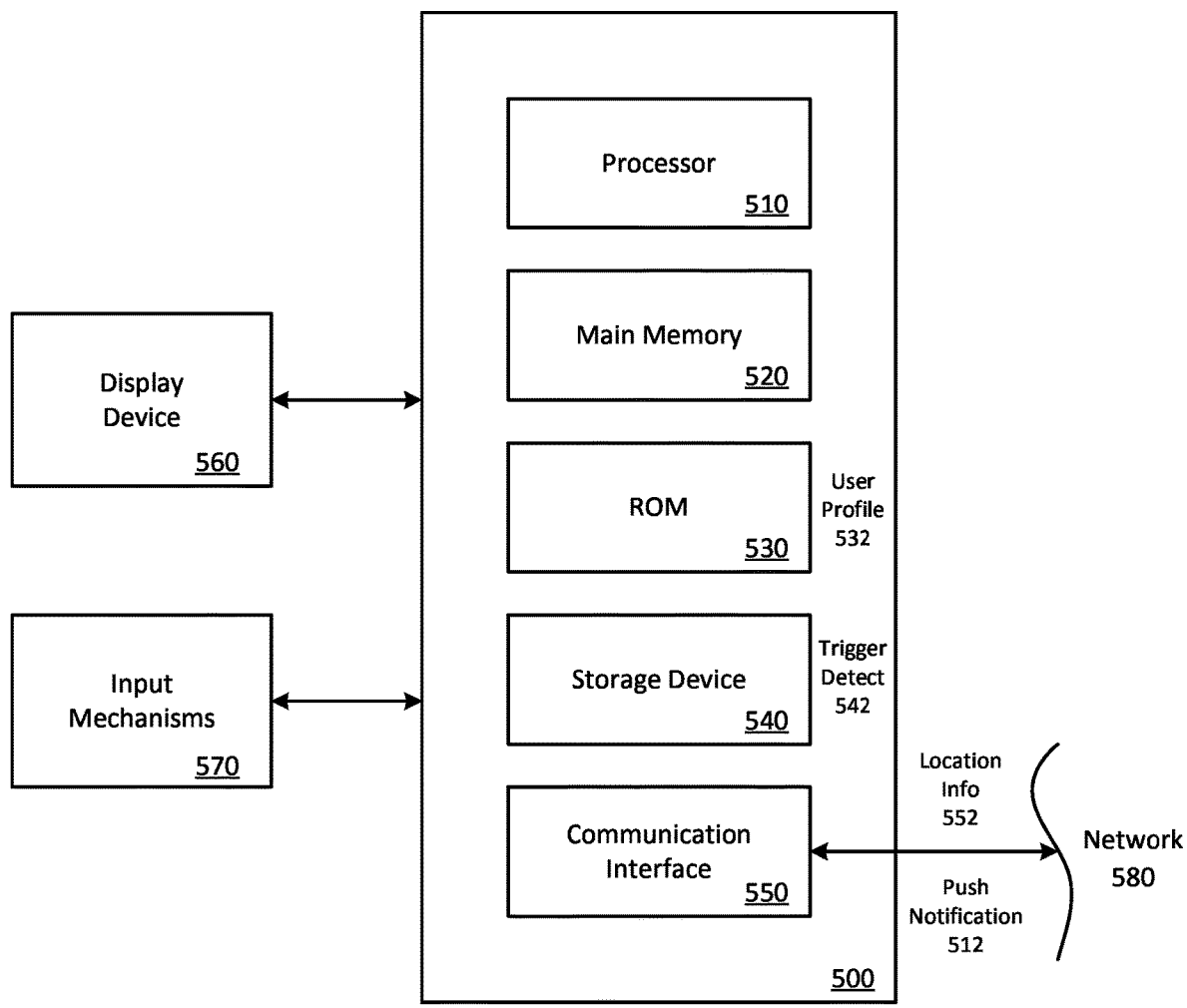
FIG. 5 is a block diagram that illustrates a computer system upon which examples described may be implemented.

FIG. 5 is a block diagram that illustrates a computer system upon which examples described herein may be implemented. For example, in the context of FIG. 1, the system 100 may be implemented using a computer system 500 such as described by FIG. 5. The system 100 may also be implemented using a combination of multiple computer systems as described by FIG. 5.

In one implementation, the computer system 500 includes processing resources 510, a main memory 520, ROM 530, a storage device 540, and a communication interface 550. The computer system 500 includes at least one processor 510 for processing information and a main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that stores instructions for the trigger event detection logic 542 for performing operations discussed with respect to FIGS. 1 through 4D.

The communication interface 550 can enable computer system 500 to communicate with one or more networks 580 (e.g., cellular network) through use of the network link (wireless or wireline). Using the network link, the computer system 500 can communicate with a plurality of devices, such as the mobile computing devices of the clients and service providers. According to some examples, the computer system 500 can receive location information 552 from the mobile computing devices of the clients and service providers via the network link. Furthermore, the ROM 530 (or other storage device) can store user profiles 532 which include various user configured push notification triggers that may configure the processor 510 to detect trigger events. The processor 510 can use the location information 552 of the devices, the status information of the service providers, and trigger information in the user profiles 532 to determine whether a trigger event has occurred and trigger a push notification 512 accordingly. Once the processor 510 determines that a trigger event has occurred, the processor 510 can transmit, via the communication interface 550 over the network 580, push notifications 512 to the appropriate devices of the clients and service providers.

Computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to computer system 500 for communicating information and command selections to processor 510. Other non-limiting, illustrative examples of input mechanisms 570 include a mouse, a trackball, touch-sensitive screen, or cursor direction keys for communicating direction information and command selections to processor 510 and for controlling cursor movement on display 560.

Examples described herein are related to the use of computer system 500 for implementing the techniques described herein. According to one example, those techniques are performed by computer system 500 in response to processor 510 executing one or more sequences of one or more instructions contained in main memory 520, such as the trigger event detection logic 542. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
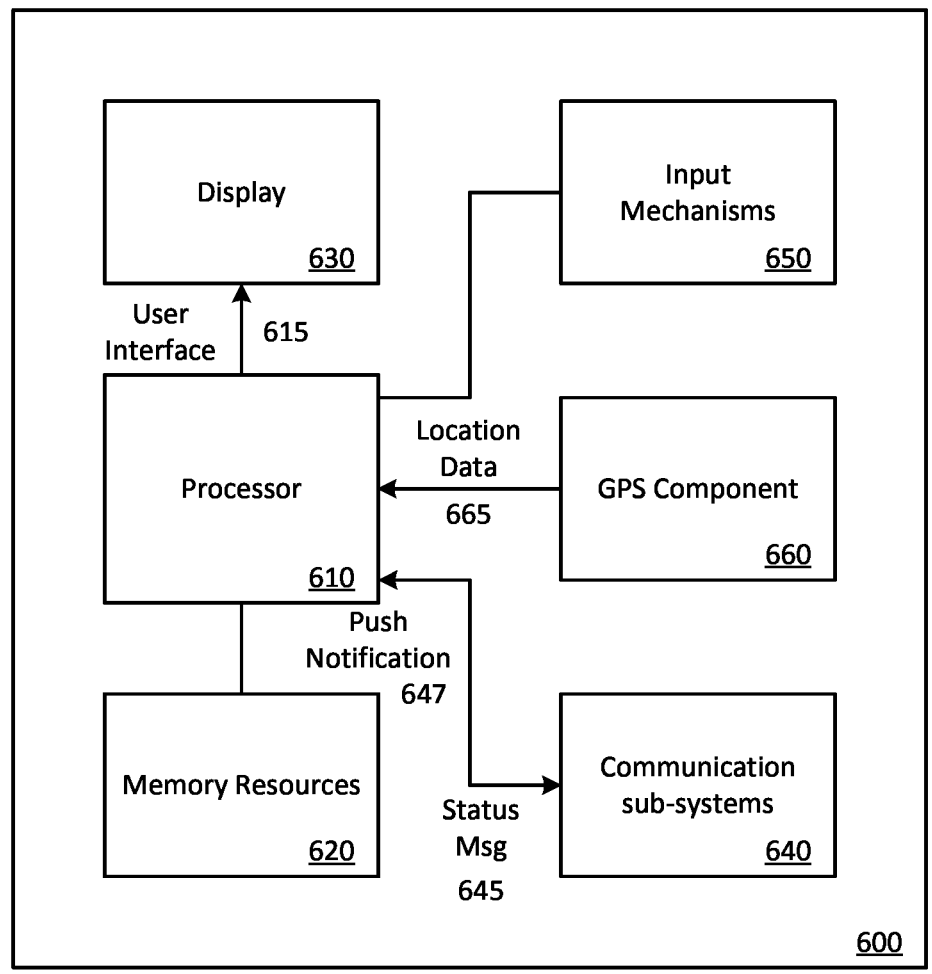
FIG. 6 is a block diagram that illustrates a mobile computing device upon which examples described herein may be implemented.

FIG. 6 is a block diagram that illustrates a mobile computing device 600 upon which examples described may be implemented. In one example, the computing device 600 may correspond to a mobile computing device, such as a cellular device that is capable of telephony, messaging, and data services. The computing device 600 can correspond to a client device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described with implementations, such as described by FIGS. 1 through 4D, and elsewhere in the application. Processor 610 is configured, with instructions and data stored in the memory resources 620, to operate a service application as described in FIGS. 1 through 4D. For example, instructions for operating the service application in order to display user interfaces can be stored in the memory resources 620 of the computing device 600.

A user, for example, can operate a mobile computing device (such as the computing device 600) to operate the service application. The GPS component 660 can determine location information of the user, such as current location information 665 of the computing device 600. The location information 665 can be wirelessly transmitted to the transport service system (i.e., system 100 in FIG. 1) via the communication sub-systems 640 periodically and/or as part of a status message 645. A status message 645 can be transmitted to the transport service system, for example, in response to the user operating the service application. The user can indicate that he or she wishes to request transport services. The transport service system can receive the status message 645 from the computing device 600 (and other computing devices of users in a given service region) and determine trigger events associated with a requesting user's profile. The transport service system can transmit push notifications 647 to the computing device 600 via the communication sub-systems 640. The push notifications 647 can be processed by the processor 610 to provide interactive features to the user as part of a user interface 615 on the display 630.

Additionally or alternatively, a service provider, for example, can also operate a mobile computing device (such as a computing device 600) to operate the service application. The GPS component 660 can determine location information, such as current location information 665 of the computing device 600. The location information 665 can be wirelessly transmitted to the system via the communication sub-systems 640 periodically and/or as part of a status message 645 from the service provider's device 600. The status message 645 can be transmitted to the transport service system (i.e., system 100 in FIG. 1), for example, in response to the service provider operating the service application. The service provider can indicate that he or she is available to provide services (e.g., is on duty) or indicate when he or she has completed a service. The transport service system can receive the status message 645 from the computing device 600 (and other computing devices of service providers in a given geographic region) and determine trigger events associated with a requesting service provider's profile. The transport service system can transmit push notifications 647 to the computing device 600 via the communication sub-systems 640. The push notifications 647 can be processed by the processor 610 to provide the push notifications to the service provider as part of a user interface 615 on the display 630.

Accordingly, the processor 610 can provide a variety of content to the display 630 by executing instructions and/or applications that are stored in the memory resources 620. One or more user interfaces 615 can be provided by the processor 610, such as a user interface for the service application. While FIG. 6 is illustrated for a mobile computing device, one or more examples may be implemented on other types of devices, including full-functional computers, such as laptops and desktops (e.g., a personal computer).

CONCLUSION

It is contemplated for examples described to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

Although illustrative variations have been described in detail with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude from claiming rights to such combinations.

While certain variations have been described above, it will be understood that those variations described are by way of example only. Accordingly, this disclosure should not be limited based on the described examples. Rather, the scope of the disclosure should only be limited in light of the claims that follow when taken in conjunction with the above description and accompanying drawings.

What is being claimed is:

1. A network computer system implementing a transport service for a transport service region, comprising:
   one or more processors; and
   a memory storing instructions that, when executed by the one or more processors, cause the network computer system to:
      communicate, over one or more networks, with a calendar application executing on a mobile computing device to access a schedule of a user, the schedule including one or more calendar-based events;
      determine a calendar-based event from the one or more calendar-based events that is likely to require transport for the user to a destination of the calendar-based event;
      receive, over the one or more networks, location data determined from a location detection component of the mobile computing device of the user, the location data indicating a current location of the mobile computing device;
      determine a route for transporting the user from the current location to the destination of the calendar-based event;
      access a user profile of the user to determine whether a set of notification triggers of the user includes a triggering condition for sharing transport;
      determine, based on a transport request received from a mobile computing device of a second user, that the second user has a destination that corresponds to the route;
      access a user profile of the second user in the set of users to determine whether a set of notifications triggers of the second user includes the triggering condition for sharing transport;
      monitor, based at least in part on location data received from computing devices of drivers operating throughout the transport service region, one or more service conditions that affect transport in a specified service area including the current location; and
      based on (i) determining that the triggering condition is included in the user profile of the user and the user profile of the second user, and (ii) the one or more service conditions that affect transport in the specified service area that includes the current location of the user, transmit a notification to the mobile computing device of the user to cause a service application running on the mobile computing device to present content indicating that shared transport is available, the presented content including a selectable feature that enables the user to configure a shared transport request to rideshare with the second user and transmit the shared transport request to the network computer system to arrange the rideshare with the second user.

2. The network computer system of claim 1, wherein the executed instructions further cause the network computer system to:
   in response to a selection of the selectable feature by the user, generate and transmit, over the one or more networks, map data to the mobile computing device of the user, the map data causing the service application to generate a map feature on a display of the mobile computing device, the map feature indicating a location corresponding to the second user.

3. The network computer system of claim 2, wherein the map feature includes a communication interface to enable the user to communicate with the second user.

4. The network computer system of claim 1, wherein the one or more service conditions correspond to one or more of delays, weather, or traffic conditions.

5. The network computer system of claim 1, wherein the one or more service conditions are based on transport service data that corresponds to at least one of a demand for the transport service in the specified service area or a supply of transportation providers in the specified service area.

6. The network computer system of claim 4, wherein the executed instructions further cause the network computer system to:
   dynamically determine a price factor for the transport service based on the one or more service conditions of the specified service area; and
   automatically generate and transmit, over the one or more networks, a price factor notification to the mobile computing device of the user when the price factor crosses a price factor threshold.

7. The network computer system of claim 6, wherein executed instructions cause the network computer system to further transmit the notification based on the price factor crossing the price factor threshold.

8. A non-transitory computer readable medium storing instructions for implementing a transport service for a transport service region, wherein the instructions, when executed by one or more processors of a network computer system, cause the network computer system to:
   communicate, over one or more networks, with a calendar application executing on a mobile computing device to access a schedule of a user, the schedule including one or more calendar-based events;
   determine a calendar-based event from the one or more calendar-based events that is likely to require transport for the user to a destination of the calendar-based event;
   receive, over one or more networks, location data determined from a location detection component of the mobile computing device of the user, the location data indicating a current location of the mobile computing device;
   determine a route for transporting the user from the current location to the destination of the calendar-based event;
   access a user profile of the user to determine whether a set of notification triggers of the user includes a triggering condition for sharing transport;
   determine, based on a transport request received from a mobile computing device of a second user that the second user has a destination that corresponds to the route;
   access a user profile of the second user in the set of users to determine whether a set of notifications triggers of the second user includes the triggering condition for sharing transport;
   monitor, based at least in part on location data received from computing devices of drivers operating throughout the transport service region, one or more service conditions that affect transport in a specified service area including the current location; and based on (i) determining that the triggering condition is included in the user profile of the user and the user profile of the second user, and (ii) the one or more service conditions that affect transport in the specified service area that includes the current location of the user, transmit a notification to the mobile computing device of the user to cause a service application running on the mobile computing device to present content indicating that shared transport is available, the presented content including a selectable feature that enables the user to configure a shared transport request to rideshare with the second user and transmit the shared transport request to the network computer system to arrange the rideshare with the second user.

9. The non-transitory computer readable medium of claim 8, wherein the executed instructions further cause the network computer system to:

in response to a selection of the selectable feature by the user, generate and transmit, over the one or more networks, map data to the mobile computing device of the user, the map data causing the service application to generate a map feature on a display of the mobile computing device, the map feature indicating a location corresponding to the second user.

10. The non-transitory computer readable medium of claim 9, wherein the map feature includes a communication interface to enable the user to communicate with the second user.

11. The non-transitory computer readable medium of claim 8, wherein the one or more service conditions correspond to one or more of delays, weather, or traffic conditions.

12. The non-transitory computer readable medium of claim 8, wherein the one or more service conditions are based on transport service data that corresponds to at least one of a demand for the transport service in the specified service area or a supply of transportation providers in the specified service area.

13. The non-transitory computer readable medium of claim 11, wherein the executed instructions further cause the network computer system to:

dynamically determine a price factor for the transport service based on the one or more service conditions of the specified service area; and automatically generate and transmit, over the one or more networks, a price factor notification to the mobile computing device of the user when the price factor crosses a price factor threshold.

14. The non-transitory computer readable medium of claim 13, wherein executed instructions cause the network computer system to further transmit the notification based on the price factor crossing the price factor threshold.

15. A computer-implemented method of managing a transport service for a transport service region, the method being performed by one or more processors of a network computer system and comprising:

communicating, over one or more networks, with a calendar application executing on a mobile computing device to access a schedule of a user, the schedule including one or more calendar-based events;

determining a calendar-based event from the one or more calendar-based events that is likely to require transport for the user to a destination of the calendar-based event;

receiving, over one or more networks, location data determined from a location detection component of the mobile computing device of the user, the location data indicating a current location of the mobile computing device;

determining a route for transporting the user from the current location to the destination of the calendar-based event;

accessing a user profile of the user to determine whether a set of notification triggers of the user includes a triggering condition for sharing transport;

determining, based on a transport request received from a mobile computing device of a second user that the second user has a destination that corresponds to the route;

accessing a user profile of the second user in the set of users to determine whether a set of notifications triggers of the second user includes the triggering condition for sharing transport;

monitoring, based at least in part on location data received from computing devices of drivers operating throughout the transport service region, one or more service conditions that affect transport in a specified service area including the current location;

based on (i) determining that the triggering condition is included in the user profile of the user and the user profile of the second user, and (ii) the one or more service conditions that affect transport in the specified service area that includes the current location of the user, transmitting a notification to the mobile computing device of the user to cause a service application running on the mobile computing device to present content indicating that shared transport is available, the presented content including a selectable feature that enables the user to configure a shared transport request to rideshare with the second user and transmit the shared transport request to the network computer system to arrange the rideshare with the second user.

16. The method of claim 15, further comprising:

in response to a selection of the selectable feature by the user, generating and transmitting, over the one or more networks, map data to the mobile computing device of the user, the map data causing the service application to generate a map feature on a display of the mobile computing device, the map feature indicating a location corresponding to the second user.

17. The method of claim 16, wherein the map feature includes a communication interface to enable the user to communicate with the second user.

18. The method of claim 15, wherein the one or more service conditions correspond to one or more of delays, weather, or traffic conditions.

19. The method of claim 15, wherein the one or more service conditions are based on transport service data that corresponds to at least one of a demand for the transport service in the specified service area or a supply of transportation providers in the specified service area.

20. The method of claim 18, further comprising:

dynamically determining a price factor for the transport service based on the one or more service conditions of the specified service area; and automatically generating and transmitting, over the one or more networks, a price factor notification to the mobile computing device of the user when the price factor crosses a price factor threshold.

* * * * *